United States Patent
Gao

(10) Patent No.: US 12,039,969 B2
(45) Date of Patent: *Jul. 16, 2024

(54) SPEECH PROCESSING SYSTEM AND A METHOD OF PROCESSING A SPEECH SIGNAL

(71) Applicant: Papercup Technologies Limited, London (GB)

(72) Inventor: Jiameng Gao, London (GB)

(73) Assignee: PAPERCUP TECHNOLOGIES LIMITED, London (GB)

( * ) Notice: Subject to any disclaimer, the term of this patent is extended or adjusted under 35 U.S.C. 154(b) by 226 days.

This patent is subject to a terminal disclaimer.

(21) Appl. No.: 17/512,785

(22) Filed: Oct. 28, 2021

(65) Prior Publication Data

US 2022/0059076 A1    Feb. 24, 2022

Related U.S. Application Data

(63) Continuation of application No. 16/980,069, filed as application No. PCT/GB2019/050696 on Mar. 13, 2019.

(30) Foreign Application Priority Data

Mar. 14, 2018 (GB) ..................... 1804073
May 2, 2018 (GB) ..................... 1807225

(51) Int. Cl.
  *G10L 15/02*   (2006.01)
  *G06F 40/58*   (2020.01)
  *G10L 15/26*   (2006.01)

(52) U.S. Cl.
  CPC .............. *G10L 15/02* (2013.01); *G06F 40/58* (2020.01); *G10L 15/26* (2013.01); *G10L 2015/025* (2013.01)

(58) Field of Classification Search
  CPC ......... G06F 40/58; G10L 13/00; G10L 13/02; G10L 13/04; G10L 13/08; G10L 15/02; G10L 15/14; G10L 15/26; G10L 2015/025
  See application file for complete search history.

(56) References Cited

U.S. PATENT DOCUMENTS

| | | |
|---|---|---|
| 2009/0204401 A1 | 8/2009 | Bu |
| 2015/0127349 A1 | 5/2015 | Agiomyrgiannakis |
| 2016/0140951 A1* | 5/2016 | Agiomyrgiannakis ...................... G10L 13/02 704/260 |

FOREIGN PATENT DOCUMENTS

| | | |
|---|---|---|
| CN | 101504643 A | 8/2009 |
| CN | 105117391 A | 12/2015 |

(Continued)

OTHER PUBLICATIONS

UKIPO Combined Search and Examination Report for corresponding Application No. GB1807225.6, dated Jun. 27, 2018, 6 pages.

(Continued)

*Primary Examiner* — Angela A Armstrong
(74) *Attorney, Agent, or Firm* — Dority & Manning, P.A.

(57) ABSTRACT

A speech processing system for generating translated speech, the system comprising: an input for receiving a first speech signal comprising a second language; an output for outputting a second speech signal comprising a first language; and a processor configured to: generate a first text signal from a segment of the first speech signal, the first text signal comprising the second language; generate a second text signal from the first text signal, the second text signal comprising the first language; extract a plurality of first feature vectors from the segment of the first speech signal, wherein the first feature vectors comprise information relating to audio data corresponding to the segment of the first (Continued)

speech signal; generate a speaker vector using a first trained algorithm taking one or more of the first feature vectors as input, wherein the speaker vector represents a set of features corresponding to a speaker; generate a second speech signal segment using a second trained algorithm taking information relating to the second text signal as input and using the speaker vector, the second speech signal segment comprising the first language.

17 Claims, 27 Drawing Sheets

(56) References Cited

FOREIGN PATENT DOCUMENTS

| | | | |
|---|---|---|---|
| EP | 3267328 | 1/2018 | |
| KR | 20100068965 A | 6/2010 | |
| WO | WO 97/29482 | 4/1997 | |
| WO | WO 2010/142928 | 12/2010 | |
| WO | WO2012018802 A2 | 2/2012 | |
| WO | WO-2019161011 A1 * | 8/2019 | ............. G06F 40/42 |

OTHER PUBLICATIONS

PCT International Search Report and Written Opinion for corresponding PCT Application No. PCT/GB2019/050696, mailed on May 23, 2019, 11 pages.
Wester et al., "Speaker adaptation and the evaluation of speaker similarity in the EMIME speech-to-speech translation project," Proceedings of the 7th ISCA Speech Synthesis Workshop, Kyoto, Japan, Sep. 22, 2010, 6 pages.
Nakamura et al: "The ATR Multilingual speech-to-speech translation system," IEEE Transactions on Audio, Speech and Language Processing, vol. 14, No. 2, Mar. 1, 2006, pp. 365-376.
Zen et al: "Statistical Parametric Speech Synthesis based on speaker and Language Factorization," IEEE Transactions on Audio, Speech and Language Processing, vol. 20, No. 6, Aug. 1, 2012, pp. 1713-1724.
Arik et al. "Neural Voice Cloning with a Few Samples", 32nd Conference on Neural Information Processing Systems (NIPS 2018), Montréal, Canada, 16 pages.
Ping et al. "Deep Voice 3: Scaling Text-to-Speech with Convolutional Sequence Learning," Feb. 22, 2018, Published as a conference paper at ICLR 2018, 16 pages.
Taigman et al. "Voiceloop: Voice fitting and synthesis via a phonological loop," Feb. 1, 2018 (last revised), arXiv:1707.06588 [cs.LG], 14 pages.
Sotelo et al. "CHAR2WAV: End-To-End Speech Synthesis," Workshop track—ICLR 2017, 6 pages.
Wang et al. "Tacotron: Towards End-To-End Speech Synthesis," Apr. 6, 2017 (last revised), arXiv:1703.10135v2 [cs.CL], 10 pages.
Nachmani et al. "Fitting New Speakers Based on a Short Untranscribed Sample," arXiv:1802.06984 [cs.LG], Feb. 20, 2018, 9 pages.
Wang et al. "Style Tokens: Unsupervised Style Modeling, Control and Transfer in End-to-End Speech Synthesis," arXiv:1803.09017 [cs.CL], Mar. 23, 2018, 11 pages.
Skerry-Ryan et al. "Towards End-to-End Prosody Transfer for Expressive Speech Synthesis with Tacotron," Mar. 24, 2018, arXiv:1803.09047 [cs.CL], 11 pages.
Hsu et al. "Hierarchical Generative Modeling for Controllable Speech Synthesis", Dec. 27, 2018, Published as a conference paper at ICLR 2019, 27 pages.
Ping et al. "ClariNet: Parallel Wave Generation in End-to-End Text-to-Speech," arXiv:1807.07281, ICLR 2019 Conference Paper, Feb. 22, 2019 (last revised), 15 pages.
Shen et al., "Natural TTS Synthesis by Conditioning Wavenet on MEL Spectrogram Predictions," 2018 IEEE International Conference on Acoustics, Speech and Signal Processing (ICASSP), Apr. 15-20, 2018, 5 pages.
First Examination Report (with English translation of pp. 3-5) for corresponding Chinese Application No. 2019800188793, issued Nov. 3, 2023, 12 pages.

* cited by examiner

SPEECH PROCESSING SYSTEM AND A METHOD OF PROCESSING A SPEECH SIGNAL

PRIORITY CLAIM

The present application is a continuation of U.S. patent application Ser. No. 16/980,069, filed 11 Sep. 2020, which claims priority to PCT Application PCT/GB2019/050696, filed 13 Mar. 2019, which claims priority to GB 1804073.3 filed 14 Mar. 2018 and GB 1807225.6 filed 2 May 2018.

FIELD

The present invention relates to a speech processing system, a system for generating speaker vectors, a method of processing a speech signal, a method of generating speaker vectors, a method of training a speech signal processing system and a method of training a system to generate speaker vectors.

BACKGROUND

Spoken language translation systems have various applications, for example conference calls and voice-over translation for video or audio recordings. Various spoken language translation systems are known. Such systems may use speech recognition, text-to-text translation and text-to-speech processing steps for example.

There is a continuing need to improve such spoken language translation systems.

BRIEF DESCRIPTION OF FIGURES

Systems and methods in accordance with non-limiting embodiments will now be described with reference to the accompanying figures in which.

DETAILED DESCRIPTION

Figure 1:
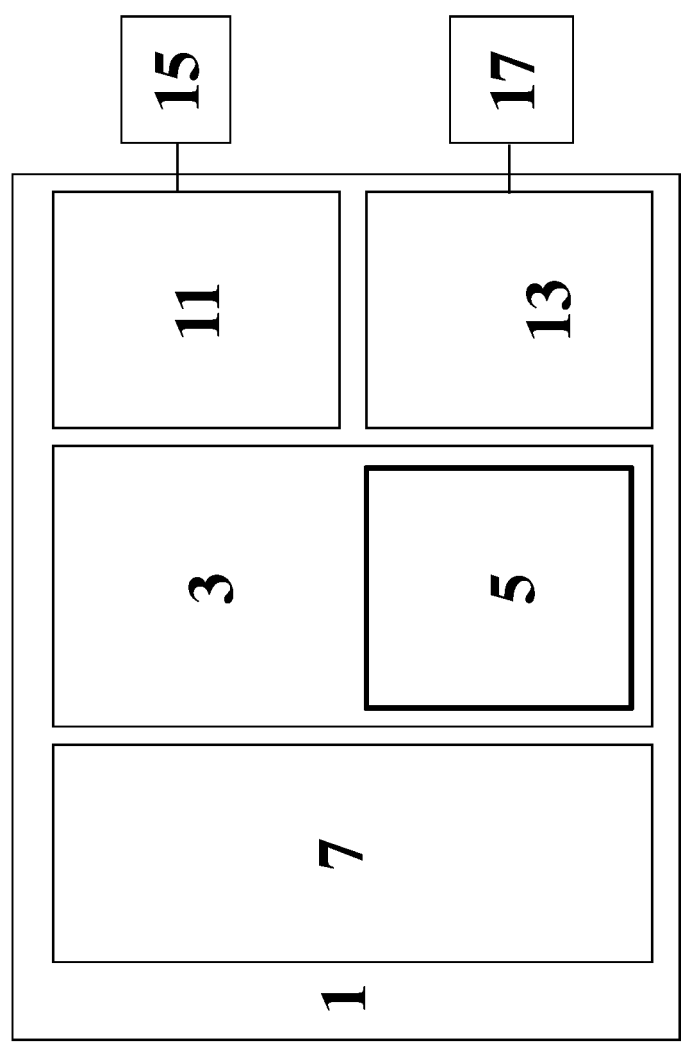
FIG. 1 shows a schematic illustration of a system for processing a speech signal in accordance with an embodiment.

According to an embodiment, there is provided a speech processing system for generating translated speech, the system comprising:

an input for receiving a first speech signal comprising a second language;

an output for outputting a second speech signal comprising a first language; and a processor configured to:

generate a first text signal from a segment of the first speech signal, the first text signal comprising the second language;

generate a second text signal from the first text signal, the second text signal comprising the first language;

extract a plurality of first feature vectors from the segment of the first speech signal, wherein the first feature vectors comprise information relating to audio data corresponding to the segment of the first speech signal;

generate a speaker vector using a first trained algorithm taking one or more of the first feature vectors as input, wherein the speaker vector represents a set of features corresponding to a speaker;

generate a second speech signal segment using a second trained algorithm taking information relating to the second text signal as input and using the speaker vector, the second speech signal segment comprising the first language.

The first feature vectors extracted from the segment of the first speech signal correspond to frames of the segment of the first speech signal.

In an embodiment, the audio data comprises spectral data, for example spectral envelope data. The first feature vectors may further comprise one or more of: information relating to the fundamental frequency of the frame of the first speech signal, information relating to the aperiodicity of the frame of the first speech signal, and information relating to whether the frame is voiced or unvoiced.

The segment of the first speech signal is input to a speech recognition module, which produces the first text signal. Generating the first text signal from the segment of the first speech signal comprises performing speech recognition taking the segment of the first speech signal as input to produce an output text signal. The first text signal may be the output text signal, or a modified output text signal. For example, generating the first text signal may further comprise receiving modifications to the output text signal.

The first text signal is input to a text-to-text translation module, producing the second text signal. Generating the second text signal from the first text signal comprises performing text to text translation taking the first text signal as input to produce an output text signal. The second text signal may be the output text signal, or a modified output text signal. For example, generating the second text signal may further comprise receiving modifications to the output text signal.

The text signals may be signals comprising actual text, or may alternatively comprise text related information, for example a sequence of phonemes. The text signals may further comprise additional information such as timing information for example.

The timing information may be used to align the second speech signal segment within the output second speech signal.

The timing information may be used to detect a difference in duration between the first speech signal segment and the second speech signal segment. The timing information may additionally be used to resample the second speech signal segment to match the duration of the first speech signal segment.

The first trained algorithm may comprise a trained neural network.

In an embodiment, the second trained algorithm is a neural network based text-to-speech system.

In an embodiment, the system is a spoken language translation system in which speaker characteristics from the input are preserved and transposed into the output speech, in a different language, on a neural network based text-to-speech system.

The speaker characteristics may embody the expression and intonation of the input speech that are lost during compression to plain text. The speech synthesis system may use these characteristics to recreate the speaker, their expressions and intonations in the target language.

In an embodiment, generating the second speech signal segment comprises: converting the second text signal into a sequence of phonetic units;

converting the phonetic units into representational vectors, the information relating to the second text signal comprising the representational vectors;

generating a plurality of second feature vectors using the second trained algorithm, the second feature vectors comprising information relating to audio data;

generating the second speech signal segment from the generated second feature vectors.

Generating the second speech signal segment from the generated second feature vectors may comprise using a third trained algorithm, for example a vocoder.

In an embodiment, the audio data comprises spectral data, for example spectral envelope data. The first feature vectors may further comprise one or more of: information relating to the fundamental frequency of the frame of the first speech signal, information relating to the aperiodicity of the frame of the first speech signal, and information relating to whether the frame is voiced or unvoiced. The second feature vectors may comprise the same features as the first feature vectors.

In an embodiment, the second trained algorithm comprises a neural network, wherein generating a second feature vector at a current time step comprises:

generating a weighted combination of the representational vectors;

generating a vector representing the weighted combination;

combining the sequence of vectors generated for the current time step and one or more previous time steps with the speaker vector to generate a combined vector; and inputting the combined vector into the neural network, the neural network outputting the second feature vector for the current time step.

The time steps may correspond to frames of the output speech signal.

In an embodiment, the representational vectors are each combined with the speaker vector before being input to the second trained algorithm.

In an embodiment, generating the second speech signal segment using the second trained algorithm further comprises using a first language vector. In an embodiment, the processor is further configured to generate a third text signal from the first text signal, the third text signal comprising a third language, and generate a third speech signal segment using the second trained algorithm taking information relating to the third text signal as input and using the speaker vector and a second language vector, the second speech signal segment comprising the third language.

In an embodiment, the language vector and the speaker vector are combined for use in the second trained algorithm.

In an embodiment, the first trained algorithm outputs one or more parameters representing a probability distribution for one or more of the features in the speaker vector, and the speaker vector is generated using the probability distribution. For example, the parameters may comprise a mean and a standard deviation and wherein the probability distribution is a Gaussian distribution, wherein the first trained algorithm outputs a mean and a standard deviation value corresponding to the features in the speaker vector, and wherein the value of the feature in the speaker vector is then generated using the Gaussian distribution defined by the mean and standard deviation value.

In an embodiment, the first trained algorithm generates a plurality of speaker vectors, each corresponding to a different part of the segment of the first speech signal. For example, each speaker vector may correspond to a word in the segment. The processor may be further configured to generate alignment information between the words in the first text signal and the words in the second text signal, and re-order the speaker vectors corresponding to the order of the words in the second text signal.

According to another embodiment, there is provided a system for generating speaker vectors, the system comprising:
  an input for receiving a plurality of first feature vectors extracted from a segment of a first speech signal comprising a second language, wherein the first feature vectors comprise information relating to audio data corresponding to the segment of the first speech signal;
  an output for outputting a speaker vector;
  a processor configured to:
    generate a speaker vector using a first trained algorithm taking one or more of the first feature vectors as input, wherein the speaker vector represents a set of features corresponding to a speaker and compatible with a first language.

According to another embodiment, there is provided a method of processing a speech signal to generate translated speech, comprising:
  inputting a first speech signal comprising a second language;
  generating a first text signal from a segment of the first speech signal, the first text signal comprising the second language;
  generating a second text signal from the first text signal, the second text signal comprising a first language;
  extracting a plurality of first feature vectors from the segment of the first speech signal, wherein the first feature vectors comprise information relating to audio data corresponding to the segment of the first speech signal;
  generating a speaker vector using a first trained algorithm taking one or more of the first feature vectors as input, wherein the speaker vector represents a set of features corresponding to a speaker;
  generating a second speech signal segment using a second trained algorithm taking information relating to the second text signal as input and using the speaker vector, the second speech signal segment comprising the first language;
  outputting a second speech signal comprising the first language.

The method may comprise speaker adaptive speech recognition, text-to-text translation and multi-speaker text-to-speech (TTS) processing.

According to another embodiment, there is provided a method of generating speaker vectors, comprising:
  inputting a plurality of first feature vectors extracted from a segment of a first speech signal comprising a second language, wherein the first feature vectors comprise information relating to audio data corresponding to the segment of the first speech signal;
  generating a speaker vector using a first trained algorithm taking the first feature vectors as input, wherein the speaker vector represents a set of features corresponding to a speaker and compatible with a first language;
  outputting a speaker vector.

According to another embodiment, there is provided a method of training a speech signal processing system, using a training dataset comprising a plurality of speech signal segments from a plurality of speakers comprising a first language and text information corresponding to the speech signal segments, the method comprising:
  extracting first feature vectors from the speech signal segments, wherein the first feature vectors comprise information relating to audio data corresponding to the speech signal segment from which the first feature vectors were extracted;
  generating first feature vectors using a second algorithm taking the text information as inputs and using speaker vectors, wherein the speaker vectors represent a set of features corresponding to the speaker;
  training the second algorithm using the extracted first feature vectors to improve the performance, wherein training the second algorithm comprises updating the speaker vectors;
  generating speaker vectors using a first algorithm taking the extracted first feature vectors as inputs;
  training the first algorithm using the updated speaker vectors generated during training of the second algorithm to improve the performance.

According to another embodiment, there is provided a method of training a speech signal processing system, using a training dataset comprising a plurality of speech signal segments from a plurality of speakers comprising a first language and text information corresponding to the speech signal segments, the method comprising:
  extracting first feature vectors from the speech signal segments, wherein the first feature vectors comprise information relating to audio data corresponding to the speech signal segment from which the first feature vectors were extracted;
  generating speaker vectors using a first algorithm taking the extracted first feature vectors as inputs, wherein the speaker vectors represent a set of features corresponding to the speaker;
  generating first feature vectors using a second algorithm taking the text information as inputs and using the speaker vectors,
  training the first algorithm and the second algorithm using the extracted first feature vectors to improve the performance, wherein training comprises updating the speaker vectors.

In an embodiment, different speech signal segments from the same speaker use the same speaker vector.

In an embodiment, the training dataset comprises a plurality of speech signal segments from a plurality of speakers comprising a plurality of languages and text information corresponding to the speech signal segments,
  wherein generating first feature vectors using the second algorithm further comprises using language vectors, wherein the language vectors represent a set of features corresponding to a language, wherein different speech signal segments from different speakers comprising the same language use the same language vector, and wherein training the second algorithm further comprises updating the language vectors.

In an embodiment, the training dataset further comprises language information identifying the speech signal segments comprising the same language, wherein the training method comprises:
  generating language information using an adversarial neural network, taking the speaker vectors generated by the first algorithm as inputs,
  training the adversarial neural network using the language information in the data set to improve the performance;
  wherein a loss of the adversarial neural network is used to train the first algorithm and the second algorithm.

According to an embodiment, there is provided a method of training a system to generate speaker vectors, using a training dataset comprising a plurality of speech signal segments from a plurality of speakers comprising a first language and text information corresponding to the speech signal segments, the method comprising:

extracting first feature vectors from the speech signal segments, wherein the first feature vectors comprise information relating to audio data corresponding to the speech signal segment from which the first feature vectors were extracted;

generating speaker vectors using a first algorithm taking the extracted first feature vectors as inputs, wherein the speaker vectors represent a set of features corresponding to the speaker;

training the first algorithm to improve the performance.

The methods are computer-implemented methods. Since some methods in accordance with embodiments can be implemented by software, some embodiments encompass computer code provided to a general purpose computer on any suitable carrier medium. The carrier medium can comprise any storage medium such as a floppy disk, a CD ROM, a magnetic device or a programmable memory device, or any transient medium such as any signal e.g. an electrical, optical or microwave signal. The carrier medium may comprise a non-transitory computer readable storage medium.

According to an embodiment, there is provided a carrier medium comprising computer readable code configured to cause a computer to perform any of the above methods.

Spoken language translation systems may generate speech in a target language LB from a textual translation of speech in source language LA. Such systems may use various speech recognition, text-to-text translation and text-to-speech (TTS) applications. Text information is extracted from the speech in the source language and used to generate speech in the target language. In such systems, the input audio speech signal is compressed into plain text, which is then translated. Information about the speaker characteristics are lost in this process, in other words speaker characteristics such as emotions and intonations are discarded.

In a speech processing system according to an embodiment, as well as the text information, a first feature vector is also extracted from each of a plurality of frames of the segment of the speech signal in the source language. The first feature vectors comprise information relating to audio data, for example spectral data or time domain audio data, corresponding to the frames of the segment of the speech signal. A first trained algorithm then takes one or more of the first feature vectors as input, and generates a speaker vector representing a set of features corresponding to the speaker. A speech signal in the target language is then generated from the text signal as input and using the speaker vector, allowing speaker characteristics from the input speech signal to be preserved and transposed into the output speech signal, in a different language.

In an embodiment, the system is a speaker adaptive spoken language translation system, in which speaker characteristics, such as accent, tone, pitch or emotions for example, from the input speech may be carried over and preserved in the translation process.

Such a system may have particular application in scenarios where multiple speakers are involved, such as conferences or multi-person video/audio calls for example, where each individual may be speaking a different language. Each speaker's characteristics are maintained, such that the listener can tell apart the speakers. The system may have further application in areas such as media and entertainment for example, where it may be used to replace the human dubbing process by automatically generating sequences of dialogue for a target language, given a piece of dialogue in a source language. This may make automatic voice-over translation possible (without using human translators or voice actors).

Using first feature vectors comprising information relating to audio data to generate a speaker vector, which in turn may be used to generate the speech signal in the target language, means that the system may be trained without using data from bilingual or multilingual speakers for example. A first trained algorithm takes audio data from the input speech as input and outputs characteristics that can be used in the target language speech synthesis system. The first trained algorithm does not use language-specific information such as text, but rather uses audio data as input. Data specific to the target language, i.e. text data, is not used to generate the speaker vector for the target language. This may in particular facilitate use of neural network based text to speech systems for example, which are heavily data-driven.

FIG. 1 shows a schematic illustration of a system for processing a speech signal 1 in accordance with an embodiment.

The system 1 comprises a processor 3 which takes an input speech signal in a source language (also referred to as the second language) and outputs a speech signal in a target language (also referred to as the first language). A computer program 5 is stored in non-volatile memory. The non-volatile memory is accessed by the processor and the stored code is retrieved and executed by the processor 3. The processor may comprise logic circuitry that responds to and processes the program instructions. The storage 7 stores data that is used by the program 5.

The system 1 further comprises an input module 11 and an output module 13. The input module 11 is connected to an input 15 for receiving the speech signal in the source language. The input 15 may be a receiver for receiving data from an external storage medium or a network. Alternatively, the input 15 may comprise hardware such as a microphone. Alternatively, the input 15 may read data from a stored audio or video file, which may be stored on the system or on a separate storage medium such as a floppy disk, a CD ROM, a magnetic device or a programmable memory device.

Connected to the output module 13 is output 17. The output 17 may comprise hardware, such as a speaker. Alternatively, the output may be a transmitter for transmitting data to an external storage medium or a network. Alternatively, the output 17 may write data in a stored audio or video file, which may be stored on the system or on a separate storage medium such as a floppy disk, a CD ROM, a magnetic device or a programmable memory device.

In an embodiment, the system 1 may be located in a common system with hardware such as a microphone and speaker for inputting and outputting speech signals. Alternatively, the system 1 may be a remote system 1, which receives data regarding the input speech signal transmitted from a microphone unit, and transmits data regarding the output speech signal to a speaker unit. For example, the system may be implemented on a cloud computing system, which receives and transmits data. Although in the described system, a single processor 3 located in a device is used, the system may comprise two or more remotely located processors configured to perform different parts of the processing and transmit data between them.

In use, the system 1 receives data corresponding to the input speech signal through data input 15. The program 5, executed on processor 3, outputs data corresponding to the output speech signal through the output 17 in the manner which will be described with reference to the following figures. The processor may comprise logic circuitry that responds to and processes the program instructions.

Figure 2A:
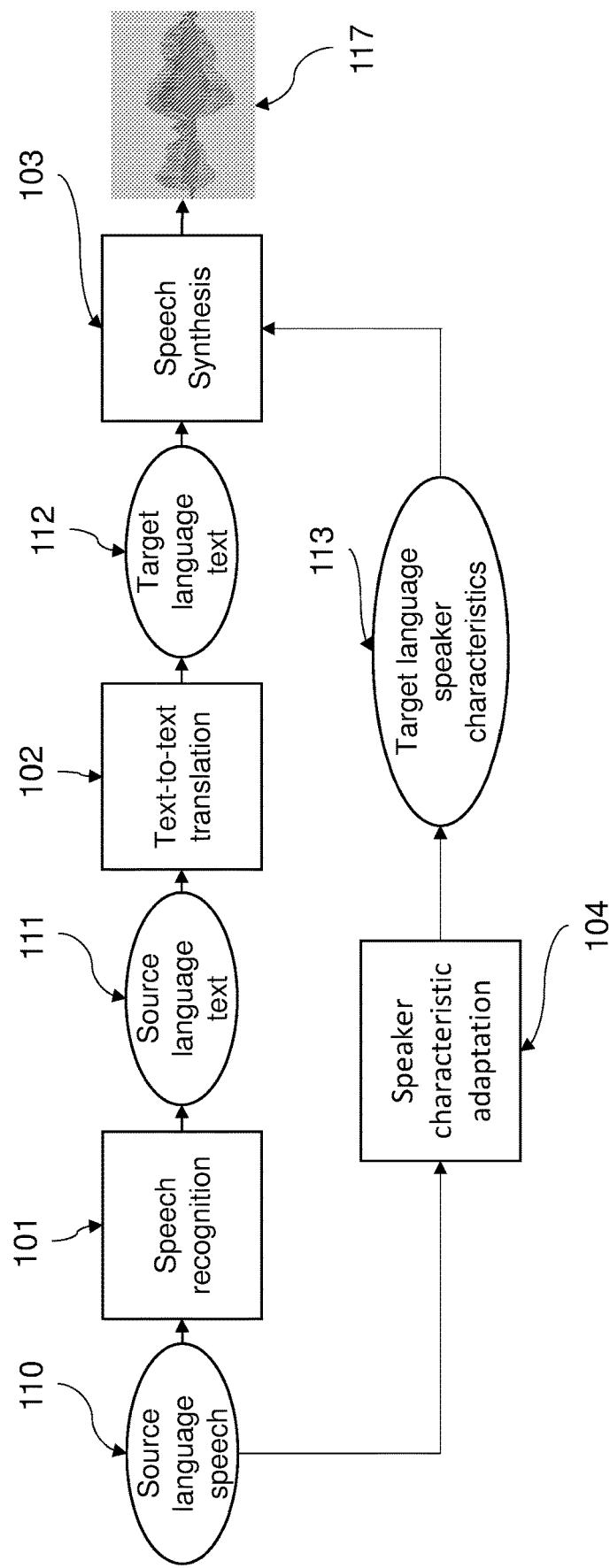
FIG. 2(a) shows a flow chart illustrating the processing stages included in a speech processing system according to an embodiment.

FIG. 2(a) shows a flow chart illustrating the processing stages included in a speech processing system according to an embodiment.

A segment of a first speech signal 110 comprising a source language A (second language) is inputted. The speech input 110 in the source language A may be collected using a microphone for example. The speech signal 110 is input to a speech recognition module 101 for example, producing text 111 in the source language A. This step comprises generating a first text signal from a segment of the first speech signal, the first text signal comprising the source language A. Any type of speech recognition process may be used in the speech recognition module 101. For example, a trained speech recognition module 101, which has been previously trained using audio and text data in the source language may be used. For example, a neural network or Hidden Markov Model based system that is deployed locally, over the cloud, or third-party APIs. In an embodiment, the speech recognition module is also configured to output timestamps for individual words or sentences.

The source language text 111 is then input to a text-to-text translation module 102, producing output text 112 in the target language B. This step comprises generating a second text signal 112 from the first text signal 111, the second text signal comprising the target language. Any type of text-to-text translation process may be used in the text-to-text translation module 102. For example, a trained text-to-text translation module 102 which has been previously trained using text data in the source and target languages may be used. In an embodiment, the text-to-text translation module is also configured to output alignment information, indicating alignment between the words in the source text and the words in the target language text.

The source language speech 110 is also input into a speaker characteristic adaptation module 104. This step may be performed in parallel with, prior to, or subsequent to the speech recognition step 101 and the text-to-text translation step 102 for example. In this step, a first feature vector is extracted from each of a plurality of frames of the segment of the first speech signal 110, the first feature vectors comprising information relating to audio data corresponding to the frames of the segment of the first speech signal 110. A speaker vector is then generated using a first trained algorithm taking the first feature vectors as input, wherein the speaker vector represents a set of features corresponding to a speaker. Thus audio features extracted from the input speech 110 are fed into a first trained algorithm, which outputs a set of speaker characteristics 113, or a speaker vector, being compatible with the target language B.

A text-to-speech module 103 then takes in both the target language text 112 and speaker characteristics 113, or speaker vector, and produces audio output 117 in the target language B, which may be broadcast using a speaker for example. This step comprises generating a second speech signal segment using a second trained algorithm taking information relating to the second text signal 112 as input and using the speaker vector 113, the second speech signal segment comprising the target language B. The second speech signal 117 is then output.

In an embodiment, the source language text 111 may also comprise timing information for each of the words, or sentences, from the source language audio signal 110. The timing information may then be included with the target language text 112 and fed into the TTS module 103 such that the timing of the output speech 117 is synchronised with the input audio.

Figure 2B:
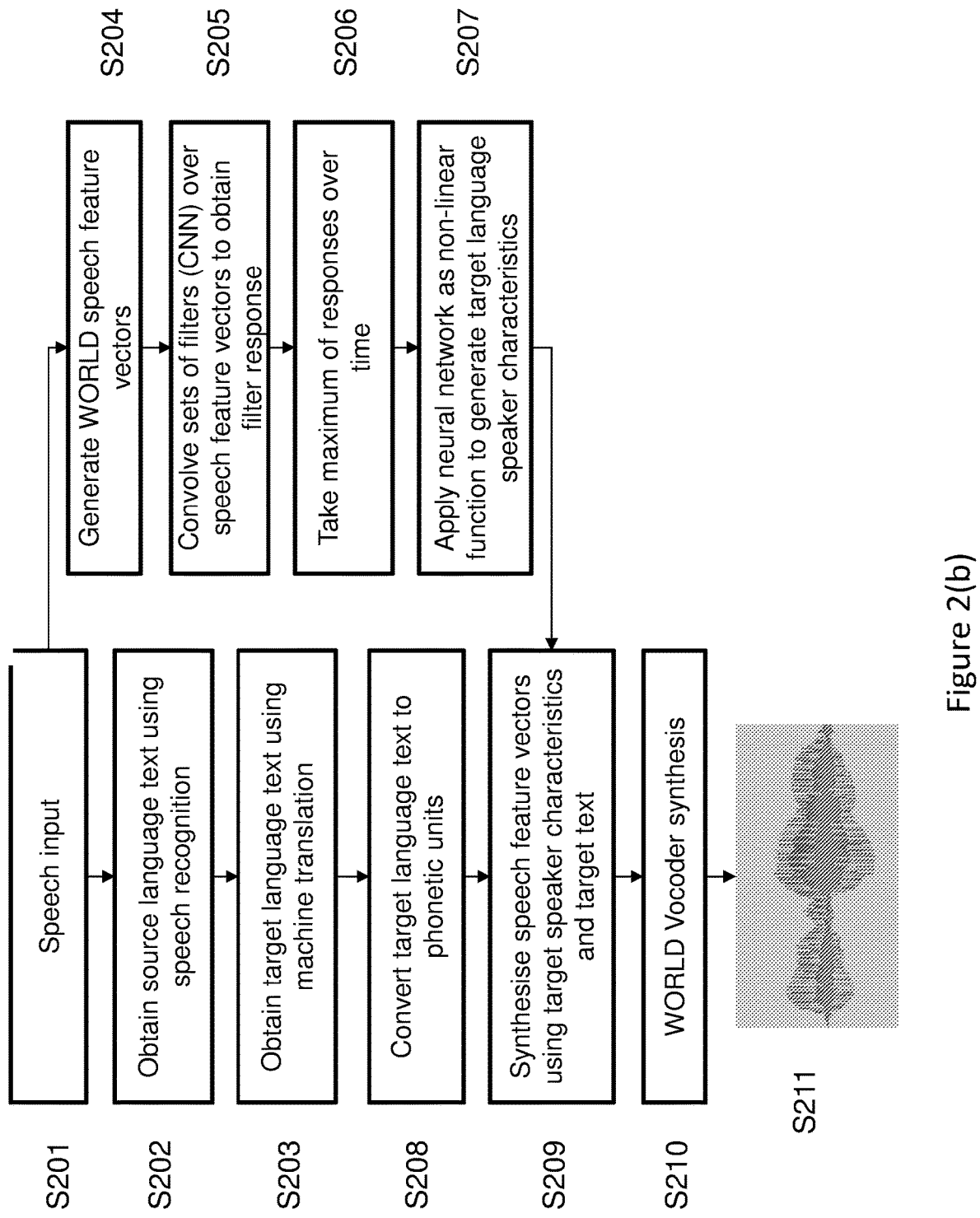
FIG. 2(b) shows a flow chart of the steps performed in a speech processing method in accordance with an embodiment.

FIG. 2(b) shows a flow chart of the steps performed in a speech processing method in accordance with an embodiment. The method is a method for speaker adaptive spoken language translation.

A segment of a first speech signal 110 comprising the source language A (second language) is inputted in S201.

The speech signal 110 is input to a speech recognition module 101 for example, which produces text 111 in the source language in S202.

The source language text 111 is then input to a text-to-text translation module 102, producing output text 112 in the target language in S203.

The source language speech 110 is also input into a speaker characteristic adaptation module 104 in S204. In this step S204, first feature vectors are extracted from the segment of the first speech signal 110, the first feature vectors comprising information relating to audio data corresponding to frames of the segment of the first speech signal 110. In this example, the first feature vectors are WORLD speech feature vectors, which will be explained in further detail below.

A speaker vector is then generated in steps S205 to S207, using a first trained algorithm taking the first feature vectors as input, wherein the speaker vector represents a set of features corresponding to a speaker. In this example, the first trained algorithm comprises a convolutional neural network, a max function and a neural network. Step S205 comprises convolving sets of filters (CNN) over the first feature vectors to obtain a filter response, step S206 comprises taking the maximum of the responses over time and step S207 comprises applying a neural network as a non-linear function to generate target language speaker characteristics. These steps will be described in further detail below, in relation to FIG. 3.

Steps S208 to S210 comprise generating a second speech signal segment using a second trained algorithm taking information relating to the second text signal 112 as input and using the speaker vector 113, the second speech signal segment comprising the target language B. In S208, target language text is converted to phonetic units, in step S209 second feature vectors (in this case WORLD feature vectors) are synthesized using target speaker characteristics (the generated speaker vector) and target text (the generated phonetic units) and in S210 vocoder synthesis is performed. These steps will be described in further detail below, in relation to FIG. 4. The second speech signal is finally output in S211.

Figure 3:
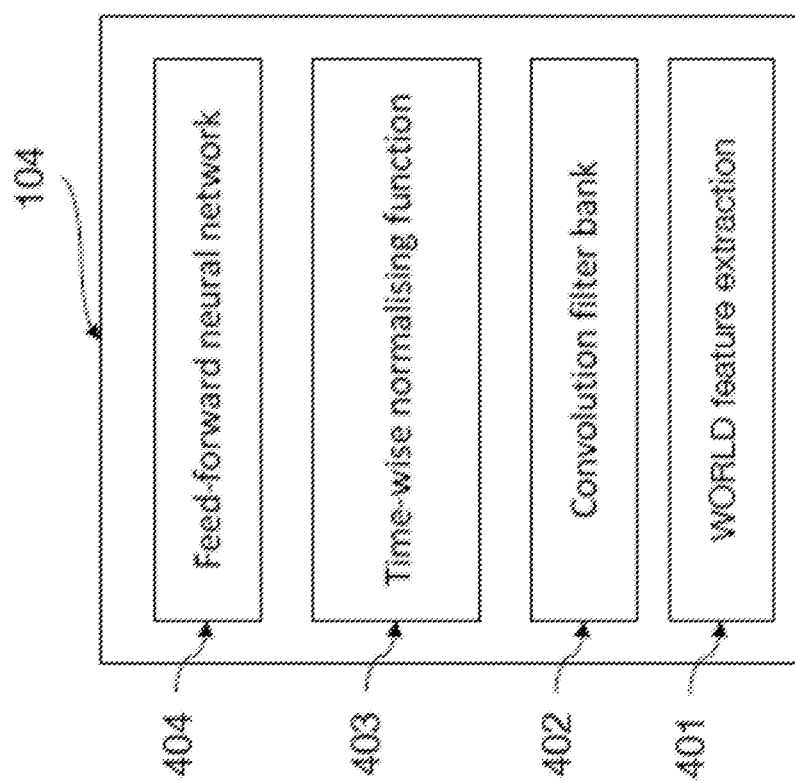
FIG. 3 shows a schematic illustration of a system for generating speaker vectors according to an embodiment.

An example of the speaker characteristic adaptation module 104 and the method of generating the speaker vectors will now be described. The speaker characteristic adaptation module 104 is an example of a system for generating speaker vectors. The system comprises an input for receiving first feature vectors (for example the WORLD feature vectors) extracted from a segment of a first speech signal comprising the source language and an output for outputting a speaker vector. The module 104 is configured to generate a speaker vector using a first trained algorithm taking the first feature vectors as input, wherein the speaker vector represents a set of features corresponding to a speaker. FIG. 3 shows a schematic illustration of the speaker characteristic adaptation module 104 according to an embodiment.

In this method of generating a speaker vector, first feature vectors are extracted from the segment of the first speech signal comprising information relating to audio data corresponding to each frame of the segment of the first speech signal. The audio data may be spectral data, for example spectral envelope data, or the time domain audio waveform, for example the time domain amplitude values of the audio waveform.

In an embodiment, extracting the first feature vectors comprises a WORLD feature extraction process, which produces a 2D matrix output with dimensions T times J for a segment of the input speech signal, where T is the number of audio feature frames in the segment of speech signal (and corresponds to the number of rows) and J is the output dimension determined by the WORLD feature extractor 401. WORLD feature vectors are vector representations of the audio signal itself, i.e. spectrogram representations of the audio waveform which can be algorithmically converted back into speech.

The output of the WORLD extractor 401 comprises spectral data SP and may further comprise information relating to one or more of the fundamental frequency $F_0$, aperiodicities BAP, and voice-unvoiced switch VUV. The aperiodicities BAP represent the size of impulse responses, as opposed to the harmonic spectrum represented by the spectral data SP. The voice-unvoiced switch VUV represents whether the sound is voiced (such as in cases of vowels), or unvoiced (such as consonants like "s" or "t"). The spectral data may be extracted using a number of frequency bins, for example greater than or equal to 60 bins. In an embodiment, J is 63, and the first feature vector comprises, for each frame of the speech segment: one F o value, one VUV value, one BAP value and 60 spectral data values, for an audio sampling frequency of 16000 Hz. In an embodiment, J is 67, and the first feature vector comprises, for each frame of the speech segment: one F o value, one VUV value, five BAP values and 60 spectral data values, for an audio sampling frequency of 48000 Hz. In an embodiment, T is 300 (for 1.5 second long audio segments, with contiguous frames which are 5 ms apart).

The sequence of first feature vectors corresponding to the segment of input speech signal is then inputted into a first trained algorithm, for example in the form of the T×J array. In an embodiment, the first trained algorithm comprises a trained neural network.

In an embodiment, the first trained algorithm comprises a convolutional filter bank 402. The WORLD feature array of size T times J outputted from the WORLD feature extractor 401 is fed into the convolution filter bank 402, which convolves a set, or a sequence of sets, of filters over its input. The convolutional filter bank 402 outputs a 2D matrix of size T times L, where L is the number of filters in the last set of the filter bank. In the example described, L=64.

The convolution filter bank 402 may be a convolutional neural network, where the filters are learnt automatically during a training stage. The training stage will be discussed in further detail later. Each set of filters may be considered as a layer within the convolutional neural network.

A convolutional neural network is a type of neural network that includes one or more convolutional layers. A convolutional layer comprises a set of linear filters, each characterised by a weights vector, and an additive bias term per filter. During operation, each filter is convolved across the input data. Each convolutional layer may have a different number of filters. Convolution of the filter across the input data results in 1-dimensional output data corresponding to each filter. The stride defines how much the filter is shifted along the input data in each step of the convolution, and is defined for each layer. The convolution operations are followed by a differentiable non-linear activation function, for example a ReLU (Rectified Linear Unit) function. The 1D data output from the filter is inputted to the activation function. The output of each layer is then fed as the input to the subsequent layer, which may be a further convolutional layer or a different type layer for example. In particular, one or more pooling layers may be included between one or more convolutional layers, which act to down-sample the data.

The weights and biases which characterise each layer are learned before operation during the training stage, which will be described below. These are the trainable parameters.

In an embodiment, the filter bank 402 comprises 5 convolutional layers and 1 pooling layer. The pooling layer may be located after the $2^{nd}$ or $3^{rd}$ convolutional layer. Each convolutional layer may comprise 64 filters, using strides of 1.

Taking the matrix output of size T times L, a time-wise normalisation function 403 may then be applied across time (i.e. across the frames) to obtain a vector of size L. The time-wise normalisation function may be the max function, mean function or a recurrent neural network for example. For example, where the max function is used, for each column L in the array, the value of the row T with the maximum entry is extracted as the value for the output vector.

The output vector from the normalising function, of length L, may then be input into a neural network 404 to obtain the speaker vector 113, which may be represented as a vector of dimension M, where the speaker vector $113 \in \mathbb{R}^M$, where in an embodiment, M is 32. The neural network 404 may be a multi-layer perceptron network for example. For example, the neural network 404 may be a 3 layer perceptron network with 32 units in each layer. During operation, each feature in the output vector from the normalising function is input. The output of each layer is then fed as the input to the subsequent layer. Each node in the hidden layers computes a weighted sum of all of its inputs (being the outputs of each input node) using a weight vector, and an additive bias term, and then applies an activation function to the result. For example, for the hidden layers, a ReLU activation function may be used. Each node in the output layer computes a weighted sum of all of its inputs (being the outputs of each hidden layer node) using a weight vector, and an additive bias term.

The weights and biases which characterise each layer are learned before operation during the training stage, which will be described below. These are the trainable parameters.

Thus the speaker characteristic adaptation module 104 generates a speaker vector using a first trained algorithm taking the first feature vectors as input. In this example, the first trained algorithm comprises a convolutional neural network 402, a time-wise normalising function 403 and a neural network 404.

Figure 4:
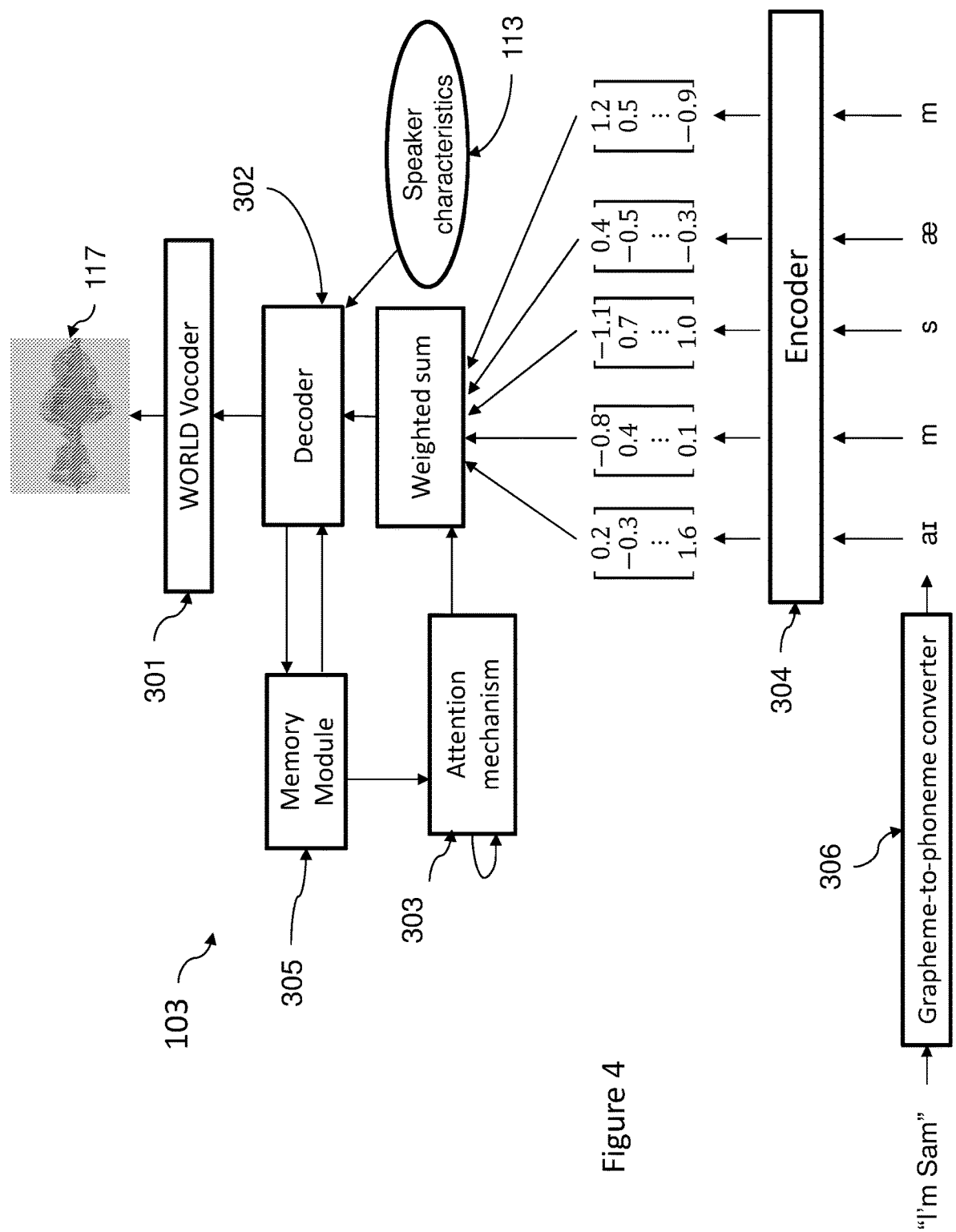
FIG. 4 shows a schematic illustration of a speech synthesis module used in a speech processing system in accordance with an embodiment.

FIG. 4 shows a schematic illustration of the speech synthesis module (or TTS system) 103 according to an embodiment. In an embodiment, the text-to-speech system 103 comprises a sequence-to-sequence neural network. In the described example, a text signal "I'm Sam" is inputted as the target language text input 112.

The text-to-speech system 103 may comprise a grapheme-to-phoneme converter 306, configured to convert the target language text input 112 (comprising a sequence of one or more words) into a sequence of phonetic units, for example units in the International Phonetic Alphabet. In an embodiment, the grapheme-to-phoneme converter 306 comprises a rule based algorithm. For the example text signal, there results a sequence of five phonetic units: $a_I$, m, s, æ, m.

An encoder 304 then converts the sequence of phonetic units to a sequence of representational vectors. The encoder 304 may comprise a look-up table for each phonetic unit and its corresponding embedding vector, a recurrent neural network, a convolutional neural network, or a combination of the above for example.

In an embodiment, the encoder 304 comprises a look-up table, where each phonetic unit is assigned a unique numerical integer corresponding to a row in the look-up table. The look up table comprises a 2D matrix of size V times H, where each integer corresponds to a row in the 2D matrix, where V is the total number of possible phonetic units and H is a fixed length. In an embodiment, H=128. The values in the 2D matrix may be learnt automatically during a training stage, and stored for use during implementation. The representational vector corresponding to an input phonetic unit is a vector of the values in the corresponding row. There is a one to one correspondence between the phonetic unit and the representational vector, thus where five phonetic units are inputted, five representational vectors are outputted, as shown in the figure.

In an alternative embodiment, the encoder 304 may comprise the look-up table, and the sequence of vectors produced from the look-up table may then be fed into a recurrent neural network. Thus the sequence of vectors corresponding to the text signal segment and produced from the look-up table are fed into a recurrent neural network (for example rolling in a left-to-right direction, vice versa, or both) where the output of the recurrent neural network may then be used as the sequence of representational vectors. The output sequence is of the same length as that output from the look-up table (thus in this example, five representational vectors). In another embodiment, the encoder 304 may comprise the look-up table and a convolutional neural network, which convolves across the sequence of vectors output from the look-up table to produce a new sequence of vectors. In both cases, the vector of each phone unit is transformed whilst taking account of the surrounding phones around that phone unit, which may increase performance.

In an embodiment, the text-to-speech system 103 comprises an attention mechanism module 303. The attention mechanism 303 may comprise a feed-forward neural network, a recurrent neural network, or a combination of both for example. The attention mechanism 303 allows for a many-to-many mapping of lengths from the input to the output.

In the described example, the attention mechanism 303 uses the attention vector itself (i.e. the vector output from the attention mechanism 303 in the previous step, which is cached for use in the next step), and the memory state (i.e. the current sequence of memory vectors stored in the memory module 305, described later). The attention mechanism may however use any combination of information from itself (such as the location of the attention, i.e. the previous attention vector), the encoder contents (the encoder output), the output itself (i.e. the WORLD vectors output by the decoder in the final step), the speaker vector, the decoder (i.e. the information passed from the decoder to the memory module) and memory module for example. The use of the speaker vector by the attention mechanism could influence how quickly or slowly the attention mechanism changes its weights, in order to accommodate different speakers speaking at different speeds for example. In particular, the attention mechanism 303 may not take the attention vector itself as input.

The decoder 302 may comprise two neural networks, a first decoder neural network for writing in to the memory module 305, and a second decoder neural network for reading out from the memory module for example. The first decoder neural network takes as input a weighted sum of the encoder output vectors (with the weights generated using the attention vector output from the attention module 303). The first decoder neural network 302 outputs to the memory mechanism 305. The second decoder neural network takes as input the current memory vectors in the memory mechanism 305, and outputs second feature vectors to the vocoder 301. The process is repeated, for each output of the attention mechanism module, to generate a sequence of second feature vectors.

In an embodiment, the second feature vectors are WORLD feature vectors. The second feature vectors may comprise the same features as the first feature vectors or different features for example. In the example described, both the first feature vector and the second feature vector comprise WORLD features.

The memory mechanism 305 may be a "First-In-First-Out" memory, which comprises S slots of feature vectors, where in an embodiment, S is 20, referred to as the memory vectors, of dimension P. In an embodiment, P=256. These correspond to the information passed from the decoder at each step. At each step, the memory module shifts right by one, such that the last feature vector at position S is deleted, while a new feature vector is written into position 1. The memory module is initialised with zeros at the beginning of operation.

The operation of the attention mechanism 303, the memory module 305 and the decoder 302 is explained in further detail in relation to FIG. 5 below.

The memory module 305 is an optional component of the TTS system 103. For example, the combination of the decoder 302 and the memory module 305 can be replaced by a single left-to-right recurrent neural network (single or multi-layered). Furthermore, it is possible to replace the First-In-First-Out memory module with a read-write memory module where, at every step, the read and write instructions are determined by a neural network for example.

The sequence of second feature vectors are converted into audio using the audio waveform synthesis module, i.e. a vocoder 301. Thus WORLD feature vectors may be converted into speech using a WORLD Vocoder 301 for example. The WORLD vocoder 301 comprises a deterministic algorithm that converts WORLD feature vectors into speech. Although a WORLD vocoder is shown, optionally, a convolutional neural network, such as Wavenet, may be used in place of the WORLD vocoder for example.

Thus the second text signal in the target language is converted into a sequence of phonetic units, each of which is in turn converted into a representational vector. The representational vectors are inputted into a second trained algorithm, comprising the attention mechanism algorithm, the first decoder neural network and the second decoder neural network, which generates second feature vectors comprising audio data. The second speech signal segment is then generated from the second feature vectors.

Figure 5:
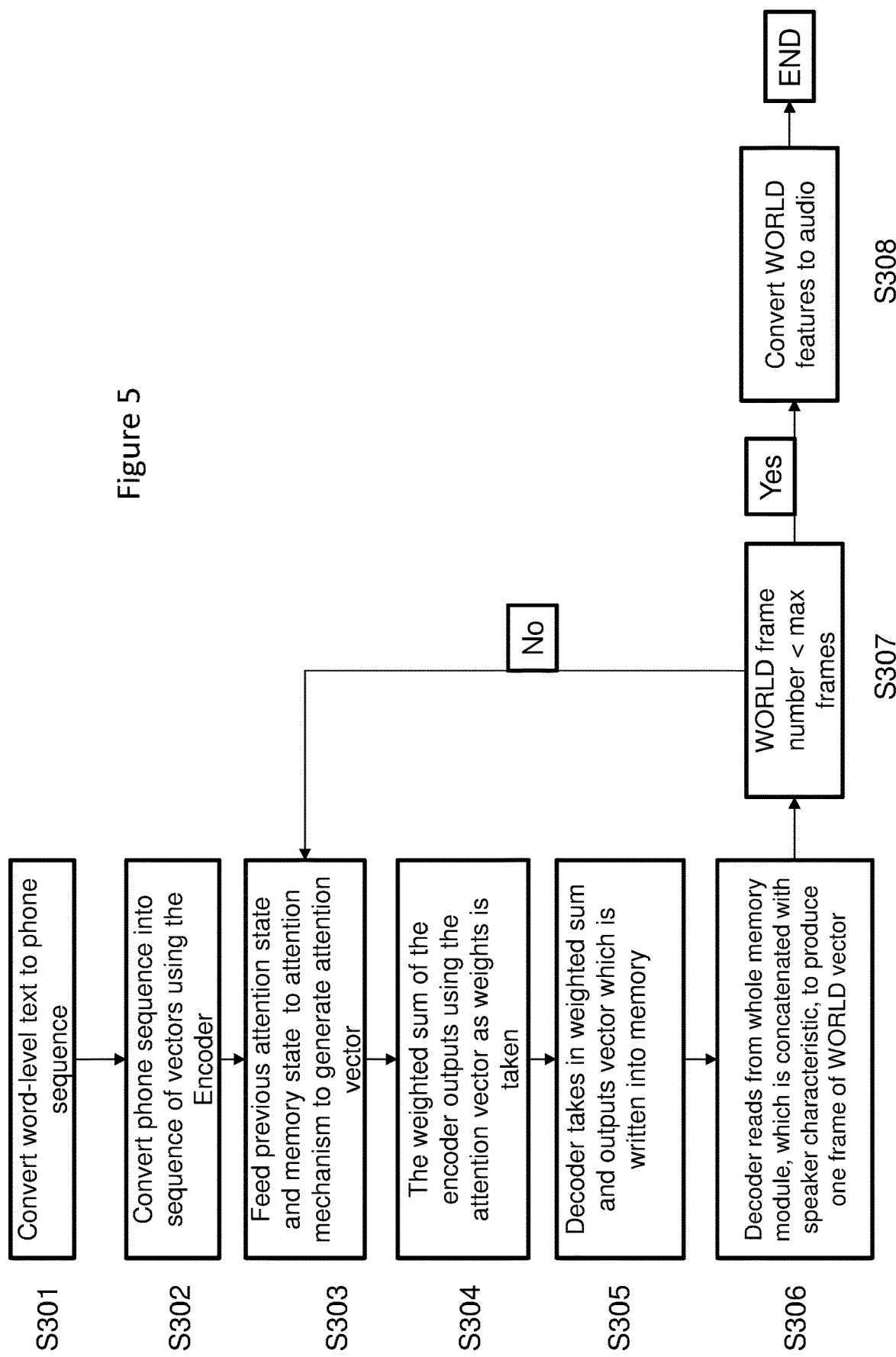
FIG. 5 shows a flow chart of the steps performed by a speech synthesis system used in a speech processing system in accordance with an embodiment.

FIG. 5 shows a flow chart of the steps performed by the text to speech system 103. The steps performed by the attention mechanism 303, the memory module 305 and the decoder 302 will be described in more detail in relation to this figure.

In step S301, the world-level text (for example, "I'm Sam") is converted to a phone sequence (in this case, the sequence of five phonetic units) by the grapheme-to-phoneme converter 306, as has been described in relation to FIG. 4 above.

The phone sequence is then converted into a sequence of representational vectors using the encoder 304 in step S302 (in this case, the five phonetic units are converted to five representational vectors), again, as has been described in relation to FIG. 4 above.

In this example, for each output frame of second (WORLD) feature vectors (up to a maximum number of frames), the attention mechanism 303 takes in the attention state vector itself (the vector output from the attention mechanism 303 in the previous step) and the memory state (i.e. the current sequence of vectors stored in the memory) to generate an output attention vector, in step S303. In this step, a 1D vector comprising the previous attention vector (of length H), concatenated with the memory state (which comprises the information from all S memory vectors stored in the memory, flattened to an S*P length 1D vector) is fed into the attention mechanism 303, to generate an attention vector of length H. Further information can be included in the input vector for the attention mechanism, as has been described above (for example the speaker vector, output WORLD feature vector etc).

In the described example, the attention mechanism 303 uses the attention state itself, and the memory state. The input is a 1D vector, having a length corresponding to {(S*P)+H} in this case. The output is a 1D attention vector, having a length H. The attention mechanism 303 may comprise a feed-forward neural network, with 2 layers of 128 units each, for example, which produces an attention vector of the same size H as the representational vectors. The attention mechanism module 303 thus outputs an attention vector.

The maximum number of frames is determined for each input segment of speech signal. In an embodiment, it is determined as a multiple of the number of phone units in the segment. In an embodiment, the maximum number of frames is 20× the number of phone units.

In step S304, a weighted sum of the representational vectors output from the encoder is taken, and fed into the decoder. The dot product of the attention vector (of length H) with each representational vector output from the encoder (each of length H) is taken, which gives a sequence of scalars (one number corresponding to each representational vector). These are used as the weights. Each representational vector is then multiplied by its corresponding weight, and the resulting weighted vectors (each of length H) are summed. The result of this is fed into the first decoder neural network.

In this step the attention vector is multiplied with the representational vectors twice, once to generate the weights, and a second time to generate the weighted combination.

In an alternative embodiment, for each output frame, the attention mechanism 303 outputs a mean and standard deviation of a Gaussian distribution. Thus the attention mechanism outputs a 2-dimensional vector, with the first value being the mean, and the second value being the standard deviation for example. In general, the attention mechanism may output one or more values defining a probability distribution. The weight for each representational vector is then generated using the index of the representational vector (i.e. the position in the sequence) and the corresponding value of the output Gaussian distribution.

Figure 22:
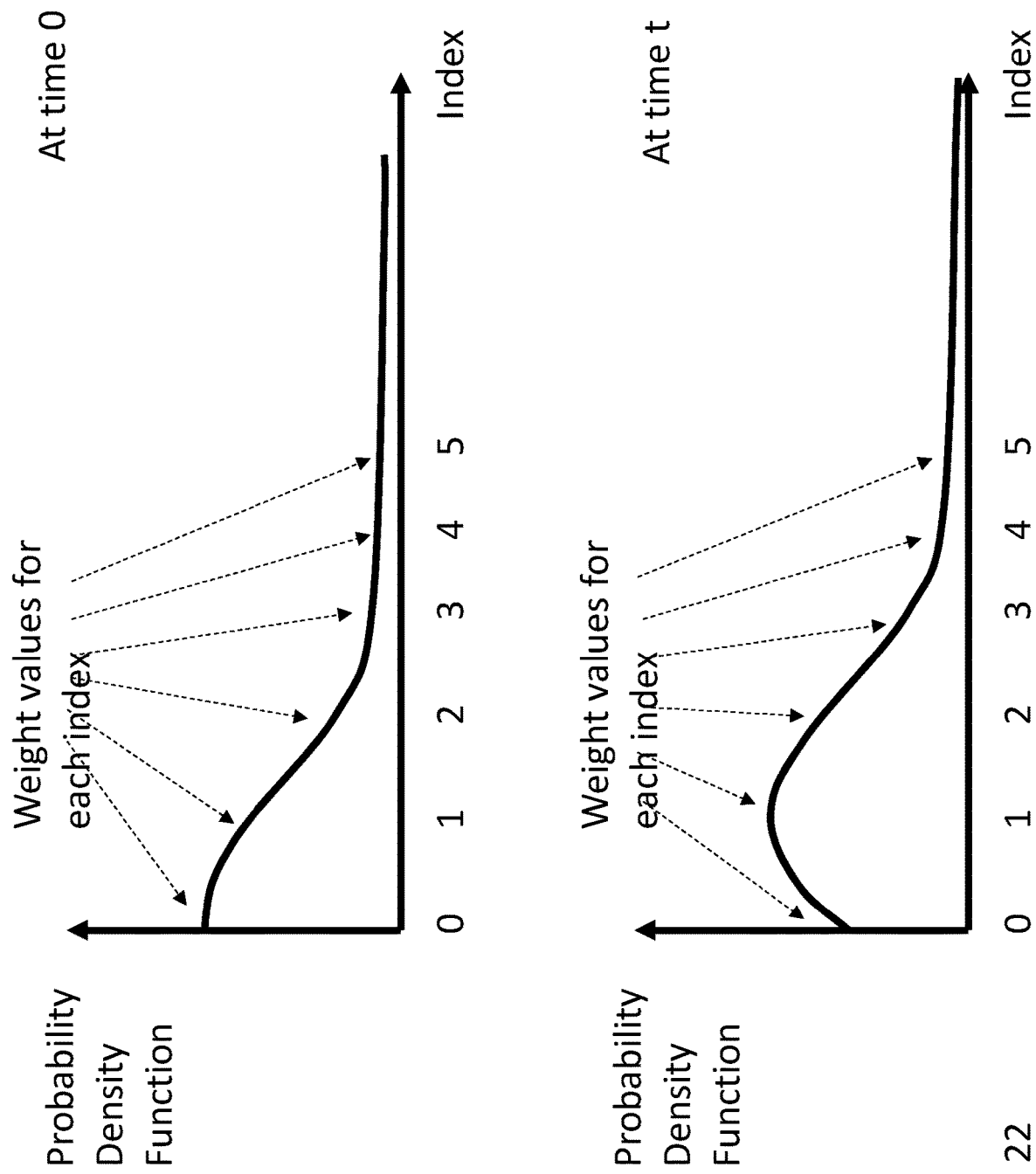
FIG. 22 shows a schematic illustration of a method of generating attention weights.

FIG. 22 shows a schematic illustration of the weight value generated for each representational vector using the index and the probability distribution. In the example, at time 0, the mean is 0 and variance 1. The weights for each of the representational vectors are dependent on the index of that representational vector, i.e. the first vector (indexed at 0) would be assigned a weight of 0.5 (being the probability density value of a Gaussian with mean 0 and variance 1 at 0). For the second representational vector, its weight would be the probability density value of the Gaussian at 1, then 2, 3, etc. At time index t, a different probability distribution with a different mean value is generated and used to obtain the weights. These weights are then used to perform the weighted sum as described previously. For example, a Gaussian distribution with mean on zero for the first output frame weights the first representational vector the most, then for each output frame it slides across the representational units.

Other kinds of probability distributions may be used, for example a Gaussian Mixture Model, with its own set of means, standard deviations and GMM weights. For a GMM, the attention mechanism may output a H by 3 dimension vector, where there are H Gaussians, and each Gaussian having a mixture weight, mean and standard deviation value.

In another embodiment, instead of outputting a mean value at each time step, the attention mechanism may output an increment to be added to the previous mean. For example, the mean may start at 0, and the attention mechanism outputs an increment to be added on to zero at each time step (i.e. for each output frame). At the next time step, the mechanism outputs another increment to be added on to the new mean. This ensures that the mean is always increasing, and enforces a monotonic relationship between the phone sequence and the output sounds.

As described above, the decoder 302 comprises two neural networks, a first decoder neural network for writing in to the memory module 305, and a second decoder neural network for reading out from the memory module 305.

In step S305, the first decoder neural network takes in the output from the weighted sum (a vector of length H). The first decoder neural network outputs a vector of length P. The output vector of length P is written into the memory module 305 in step S305. At each step, the current output vector of length P is written in at position 1 and the last vector at position S is deleted in the memory. The first decoder neural network may for example have 1 layer, with P units.

The attention vector is used to generated weights used to weight the encoder outputs when they are summed in step S304, before being inputted into the first decoder neural network. It is expected that the focus of the attention weights scans across the encoder outputs, in a monotonic fashion, as each frame is generated. This is ensured through training, in which the attention mechanism gradually learns to scan across the encoder, and at the right pace, to generate the correct outputs to the decoder.

The second decoder neural network, which for example may have 1 layer with the same number of units as the output, e.g. WORLD feature vector (for example 67 units corresponding to the 67 dimensions in a WORLD feature vector) then reads from the entire memory module, which is flattened to a S*P length 1D vector, concatenated with the speaker vector, to produce an output WORLD feature vector corresponding to one frame in S306. The second decoder neural network thus takes as input a 1D vector of length {(S*P)+M}, where M is the length of the speaker vector. The second decoder neural network outputs a 1D vector of length equal to the length of the second feature vector (e.g. the WORLD vector).

In S307, it is determined whether a maximum number of frames has been reached. If not, the attention mechanism 303 generates the next feature vector. The attention mechanism takes as input the same representational vectors output from the encoder, the updated attention state and the updated memory state. The process repeats again until a maximum number of frames has been reached in S307. The WORLD feature vectors may then be converted into speech using the WORLD Vocoder 301 in S308.

The training procedure for the speech synthesis module 103 and the speaker characteristic adaptation module will be described below. These components may be trained separately or together. They may then be used in a system together with a pre-trained speech recognition module 101 and a pre-trained text-to-text translation module 102 for example, which may be trained in any manner suited to the particular speech recognition module 101 and text-to-text translation module 102 used.

Figure 6:
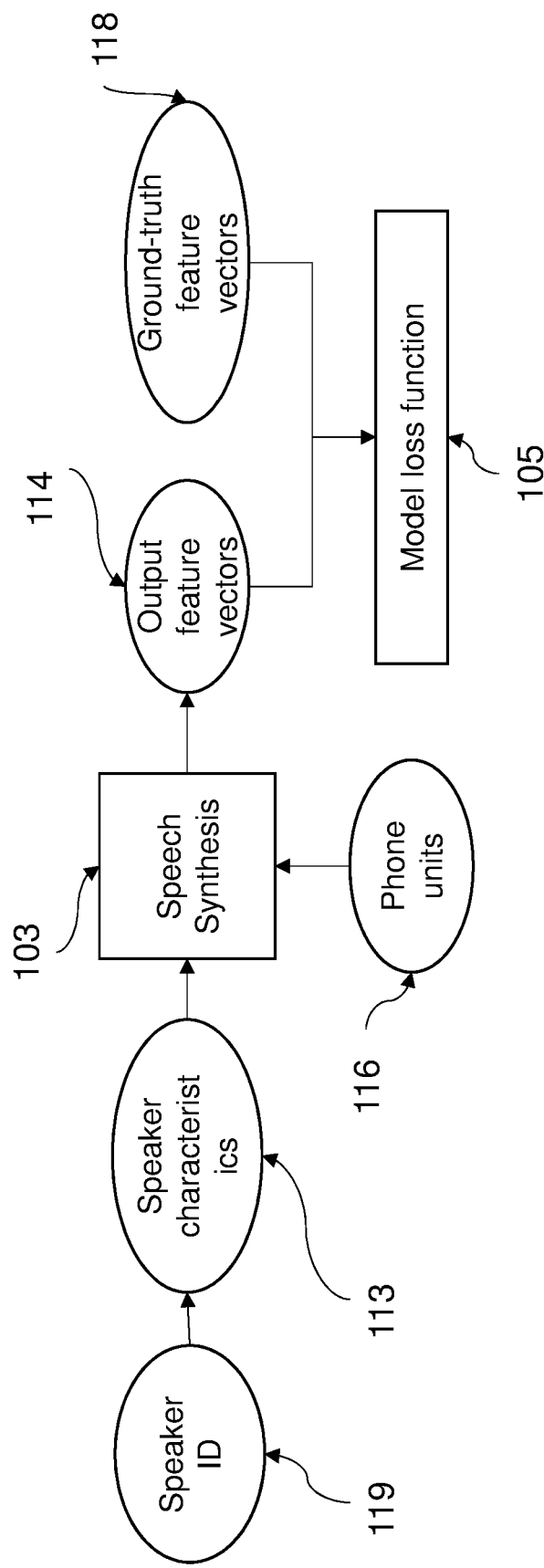
FIG. 6 is a schematic illustration of the stages of a training procedure for the speech synthesis module used in a method of training a speech processing system in accordance with an embodiment.

FIG. 6 is a schematic illustration of the stages of the training procedure for the speech synthesis module 103.

The training uses a training dataset comprising a plurality of speech signal segments from a plurality of speakers comprising a first language and text information corresponding to the speech signal segments. Each example in the training data may contain: the speech audio 117 itself, which are converted to WORLD vectors 118; the corresponding text 112, which are converted to phone units 116 through the grapheme-to-phoneme converter 306; and a speaker ID 119. Each speaker ID 119 is initially mapped onto a trainable speaker characteristic vector 113. Each speaker ID is stored in a lookup table for example, with the corresponding speaker vector 113.

Thus each speaker in the training data set has a corresponding speaker vector 113. For each segment of speech corresponding to the same speaker, the same speaker vector 113 is used (updated progressively through the training process). Since different segments of speech corresponding to the same speaker will have the same speaker vector, the speaker vector is independent of the text/word information.

The text information 112 comprises the text signal, and may further comprise some information about timing, such that the output can be synced to the original input.

Training is performed by feeding in the speaker vector 113 and the phone sequence 116 for a segment, producing a sequence of WORLD vector outputs 114 in the same way as has been described above in relation to the operation stage. The output WORLD feature vectors 114 may be used to determine a loss 105, using the target WORLD vectors 118 extracted directly from the audio signals as ground truths. The gradient of the loss with respect to each of the trainable parameters of the speech synthesiser, including the speaker characteristics 113, can be determined through back-propagation. The gradients may then be used to determine the updated parameters, using an optimiser function. An example of the loss function that may be used is a mean squared loss E2:

$$L = \frac{1}{NT}\sum_{n=1}^{N}\sum_{t=1}^{T}\|\hat{y}_{t,n} - y_{t,n}\|^2$$

where ŷ is a WORLD feature vector extracted from the audio (ground truth) of dimension J, where there are T instances (frames) in the utterance n, y is a WORLD feature vector generated from the speech synthesis module also of dimension J, with T instances for each element in the batch of N. N is the batch length, where N may be equal to 128 utterances for example. Each batch has a random selection of speakers and utterances. The loss shown is the average over the batch.

Determination of the gradients may be performed using a computational graph. Computational graphs and their relevance to training of neural networks will now be described in relation to FIGS. 17 and 18 below.

Figure 17:
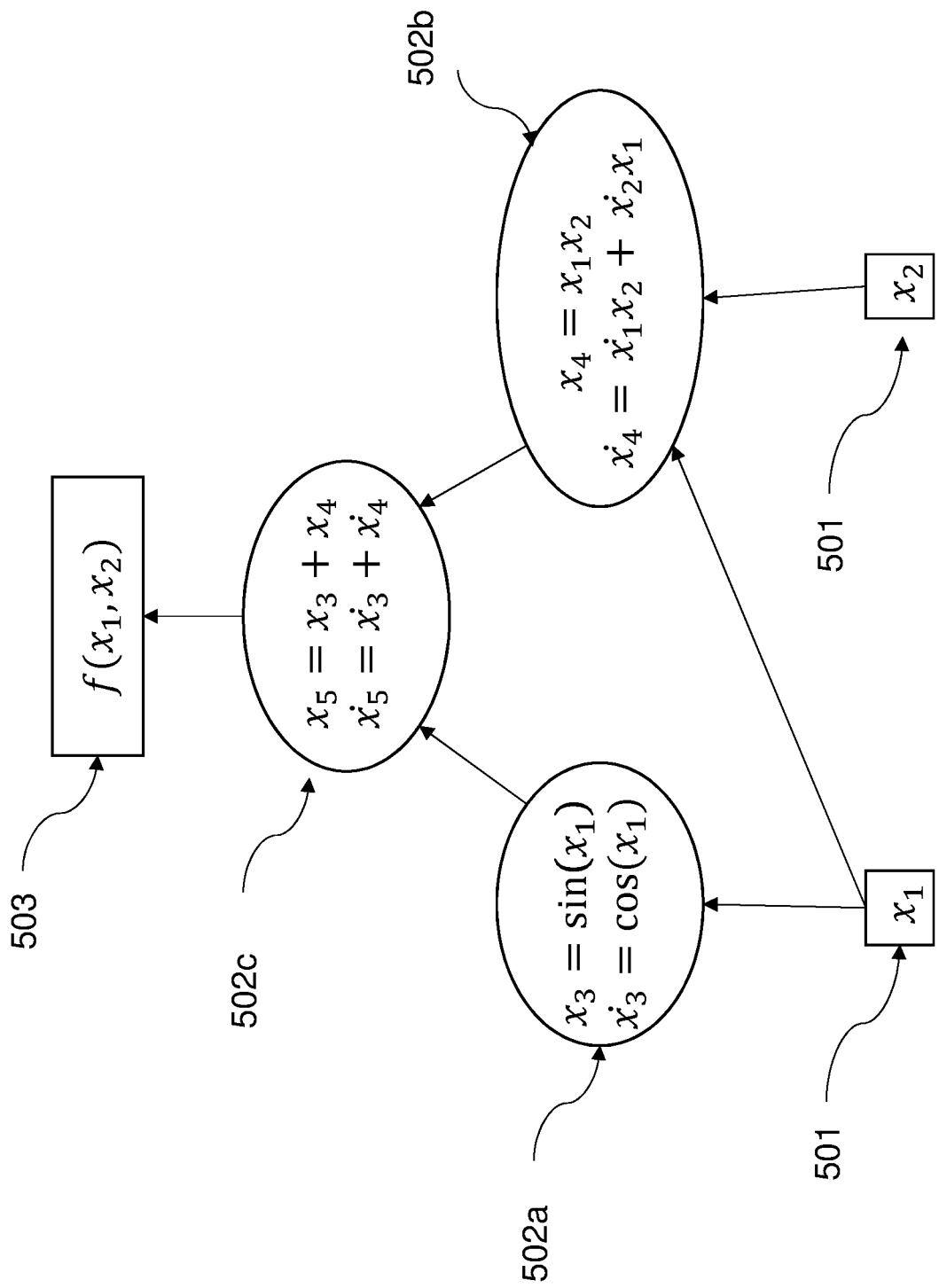
FIG. 17 is a schematic illustration of an example of a computational graph.

FIG. 17 is a schematic illustration of an example of a computational graph for a simple function $f(x_1, x_2)=\sin(x_1)+x_1 x_2$. This simple function is mapped to the computational graph, in order to show how a computational graph may be used to represent a series of operations. Each neural network in the speech synthesis system 103 may be mapped to a computational graph in a similar manner, which can then be used to determine the gradient of the loss with respect to each trainable parameter, including the speaker vectors. The frameworks (i.e. the neural network modules in the speech synthesis system 103) may be implemented in auto-differentiation frameworks such as PyTorch or TensorFlow for example. Each neural network module in the speech synthesis system is mapped to a directed, differentiable computational graph during the forward pass.

In the example, each node 502 in the graph represents an operation such as addition, multiplication or other mathematical functions. In the example, the inputs 501 to the function are $x_1$ and $x_2$. In this case, the input $x_1$ is inputted into node 502a and node 502b. The input $x_2$ is inputted into node 502b.

In node 502a, a value $x_3$ is calculated, where $x_3=\sin(x_1)$. The expression for the total derivative of $x_3$ is also shown, where in this case $\dot{x}_3=\cos(x_1)$. The derivative values (with respect to any of the variables, e.g. $x_1$, $x_2$) may also be calculated during the forward pass. Thus for each input value of $x_1$, a functional representation of $x_3$ and $\dot{x}_3$ (with respect to one or more of the variables) may be determined during the forward pass. The functional representations of the derivatives may be determined and saved during a forward pass, while the values are calculated during back-propagation once the loss is obtained.

Similarly, in node 502b, $x_4$ is a function of $x_1$ and $x_2$, where $x_4=x_1 x_2$. The expression for the total derivative is also given, $\dot{x}_4=\dot{x}_1 x_2+\dot{x}_2 x_1$. For each input value of $x_1$ and $x_2$, a value of $x_4$ and a functional representation of the derivative of $x_4$ (with respect to one or more of the variables) may be determined.

The input to node 502c is the output of node 502a (i.e. $x_3$) and the output of node 502b (i.e. $x_4$), where $x_5=x_3+x_4$. The expression for the total derivative is also given, $\dot{x}_5=\dot{x}_3+\dot{x}_4$. In node 502c, for each input value of $x_1$ and $x_2$, a value of $x_5$ (which is a function of $x_3$ and $x_4$) and a value of the derivative of $x_5$ (with respect to any of the variables) may be calculated.

The output 503 of node 502c is the output value of the function $f(x_1, x_2)$.

For each node that is reliant on another node (for example node 502c in the figure), the chain rule is used to obtain a representation of the differentiation. In each forward pass, the derivatives of the functions with respect to one or more of the variables may be accumulated and saved for each node, such that during back-propagation, values are fed into the derivative expressions and the values of the gradients are then obtained.

It can be seen that each neural network module in the speech synthesis system 103 may be represented by a computational graph in a similar manner. These may be connected together into a single computational graph. The calculations in the graph are performed for each utterance in the batch at a time.

Figure 18:
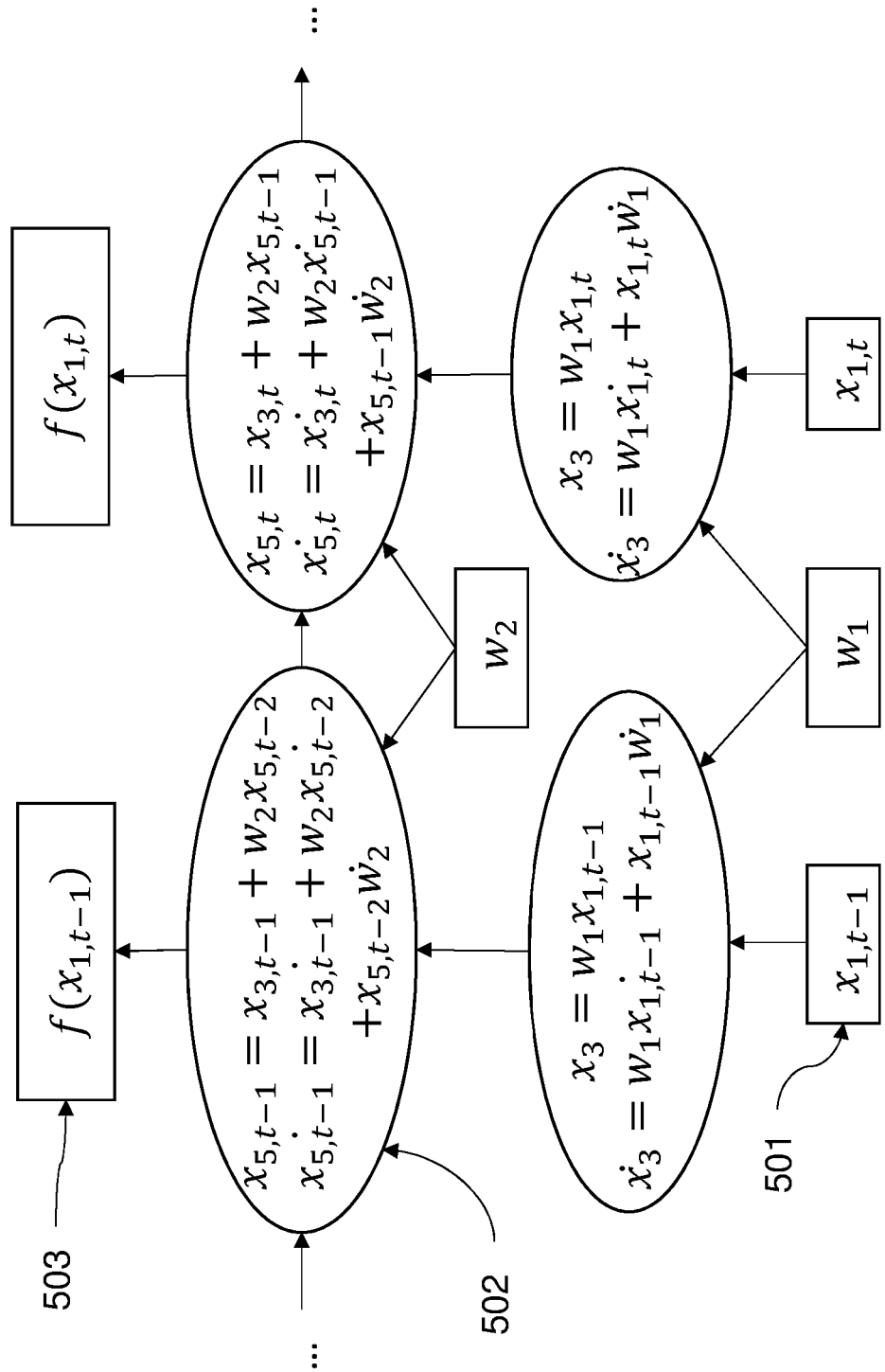
FIG. 18 is a schematic illustration of a computational graph unfolded through time.

FIG. 18 is a schematic illustration of a simple computational graph unfolded through time. For neural networks that use the same weights for each time step (i.e. each generated frame), the computational graph is unfolded for each of the time steps that occurs during the forward pass. For parameters which are used across time, the graph still treats the parameters across time as separate parameters, but during the update, the update for the specific parameter that is used across time is averaged across time. In other words, the gradient of the loss with respect to the weight at each time step is determined, and these values are then averaged to give a final gradient of the loss with respect to the weight (for example).

The horizontal arrows in the computational graph, which denote where the input to one node is the output from a node at a previous time step, can be used to represent the read/write memory operations described in relation to the speech synthesis above for example. Backpropagation across the entire graph (and therefore neural network) for all time steps for an input utterance is therefore possible, as long as each of the operations used is differentiable.

Thus for a single training example in a batch, which may have a size of 128 utterances for example, the gradient of the loss with respect to each of the parameters (i.e. weights and biases in the neural networks, the speaker vectors, etc) is calculated, based on the back-propagated error signal and the feedforward activation signals (inputs to each layer). Every operation performed in the forward pass is differentiable and therefore a functional expression for the derivative of the loss with respect to every single parameter (i.e. weights, biases, speaker vectors) can be determined by the chain rule. The gradient values are calculated from these expressions using the back-propagated error and the activations (inputs for each layer from the forward pass, cached during the forward pass).

In the simple example computational graph shown in FIG. 18, the function f may correspond to the loss for a particular frame (time step) for example. Thus $f(x_{1,t})$ may correspond to the loss at time step t. The value of the function f corresponds to $x_5$. The gradient of the loss at time step t with respect to each of the parameters (i.e. the weights $w_1$ and $w_2$ in this example case) corresponds to the derivative of $x_{5,t}$ with respect to the particular weight. This may be determined from the expression for the total derivative. The gradient of the loss with respect to the weight at each time step is determined, and an average value is used.

In this case, $x_{5,t}=x_{3,t}+w_2 x_{5,t-1}$. The expression for the total derivative is $\dot{x}_{5,t}=\dot{x}_{3,t}+w_2\dot{x}_{5,t-1}+x_{5,t-1}\dot{w}_2$. Furthermore, $x_3=x_1 x_{1,t}$ and the expression for the total derivative is $\dot{x}_3=w_1 x_{1,t}+x_{1,t}\dot{w}_1$. In order to determine the derivative of the loss ($x_5$) with respect to the weight $w_2$ for example, the derivative of $x_5$ with respect to $w_2$ would be determined. Of course in practice the loss function would be quite different, and the computational graph will contain many nodes and parameters. However, the gradients may be determined using the computational graph in a similar manner.

In the speech synthesis module, the speaker vector of length M is concatenated with the memory module state (of length S*P) and the result inputted into the second decoder neural network. This is a differentiable operation, and thus a value of the gradient of the loss with respect to each feature in the speaker vector can be determined for the input example (in the same way as a value of the gradient of the loss with respect to each weight and bias is determined). The concatenation operation has no effect on differentiation and the calculation of the gradients, since each dimension in the input to a neural network layer is treated independently, the parameters in the speaker vector are not affected by the memory module state in any way, and therefore its gradients do not depend any part of the memory module through the chain rule.

The computational graph may result in an array of gradient values, each corresponding to a parameter, for each training example in the batch. These are converted to a single gradient value for each parameter (for example by taking the average of the gradient values for all training examples for the particular parameter in the batch).

The gradient for each parameter is then used to calculate the updated parameter from the previous values using the optimizer function (i.e. a gradient descent type optimiser function). The input to the optimiser function for each parameter is the previous value, the corresponding gradient value and a learning rate parameter. In general, gradient descent based optimizers update the parameter in the direction of steepest descent of the loss function with respect to the parameter, scaled by a learning rate, for example 0.001. The update is averaged across the batch in order to account for noise in individual training examples and increasing the generalising power of the trained neural network. Thus the gradient values are averaged across the batch and then used in the optimiser to determine the new parameter values. The parameters are replaced with the new values and the process iterates with another batch of training signals.

In an embodiment, while the speaker vectors lie in the same M-dimensional space $\mathbb{R}^M$, each individual speaker characteristic for each speaker is updated only by utterances which are of the same speaker, as the individual parameters in each of the dimensions of the speaker characteristic vectors are independent from each other and from other speaker characteristic vectors.

In this embodiment, in back-propagation, a gradient update for a parameter is only calculated after the parameter is used in the forward pass. This means that a specific parameter in the speaker characteristic vector for a specific speaker is only updated when that speaker ID and a corresponding utterance is present in the batch. Further, if multiple utterances for the same speaker is used, the gradient update is still averaged "across the batch", i.e. there may be 3 utterances from a particular speaker in a batch of N, then the gradient updates from those 3 utterances is summed and divided by N, (since the gradient update from the rest of the batch is zero). Thus the gradient values for the speaker vector feature for each utterance in the batch with the same speaker ID are combined (for example averaged) to give a single gradient value corresponding to each speaker vector feature. These are then used to update each speaker vector using the optimizer function. In this way, the speaker vectors for each speaker ID are updated separately.

In an embodiment, one or more constraints are placed on the speaker characteristics during training, such as that the squared norm of the speaker vectors must be less or equal to unity. This may be enforced after the update, i.e. perform the gradient update, and divide the output vector by the squared norm, such that the squared norm is at unity.

At the beginning of training, the speaker characteristic vectors for each speaker in the training data may be randomly initialised (along with the other trainable parameters). Within the training data, there are many utterances from different speakers, such that many speakers utter the same words (and sometimes sentences) as each other. This means that within a single batch during training, there may be instances of the same sentences by different speakers and different sentences by the same speakers to train on, allowing the system to learn what is common and different within the input and output.

During training, the speaker characteristic vector for each training speaker is iteratively updated as parameters of the TTS system 103. As such, the characteristics for each speaker start to gradually represent meaningful information to the TTS system.

Optionally, during training, a small amount of noise (for example, Gaussian distributed noise) is added to the speaker characteristics to encourage the TTS system 103 to be more tolerant to noise, or small errors that would be generated by the speaker adaptation module 104.

Figure 7:
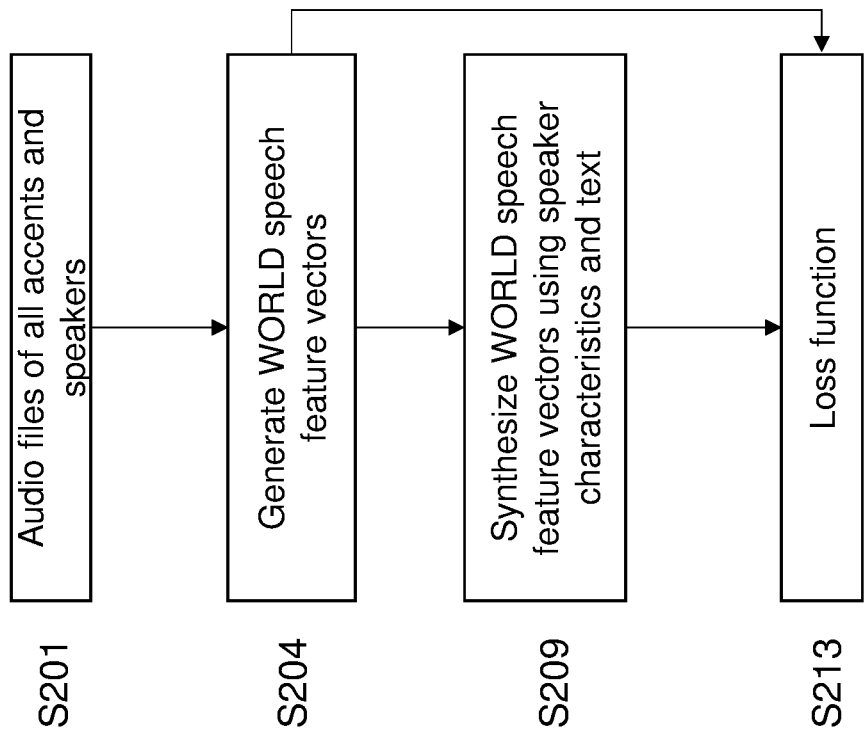
FIG. 7 shows a flow chart of a method of training a speech synthesis system in accordance with an embodiment.

FIG. 7 shows a flow chart of a method of training a speech synthesis system 103 in accordance with an embodiment. As has been described above, the training uses a training dataset comprising a plurality of speech signal segments from a plurality of speakers comprising a first language and text information corresponding to the speech signal segments. These are obtained in S201.

In S204, the first feature vectors are generated from the speech signal segments, wherein the first feature vectors comprise information relating to spectral data corresponding to the speech signal segment from which the first feature vector was extracted. In this example, the first feature vectors are WORLD speech feature vectors, and are extracted from the audio data in the same manner as during operation.

Step S209 comprises generating first feature vectors using a second algorithm taking the text information as inputs and using speaker vectors, wherein the speaker vectors represent a set of features corresponding to the speaker. In this step, WORLD speech feature vectors are synthesized using the text to speech system 103, in the same manner as during operation.

S213 comprises updating the parameters of the second algorithm using the extracted first feature vectors to improve the performance, including updating the speaker vectors.

The training of the speech synthesis system may be performed using training data in a single language.

Figure 8:
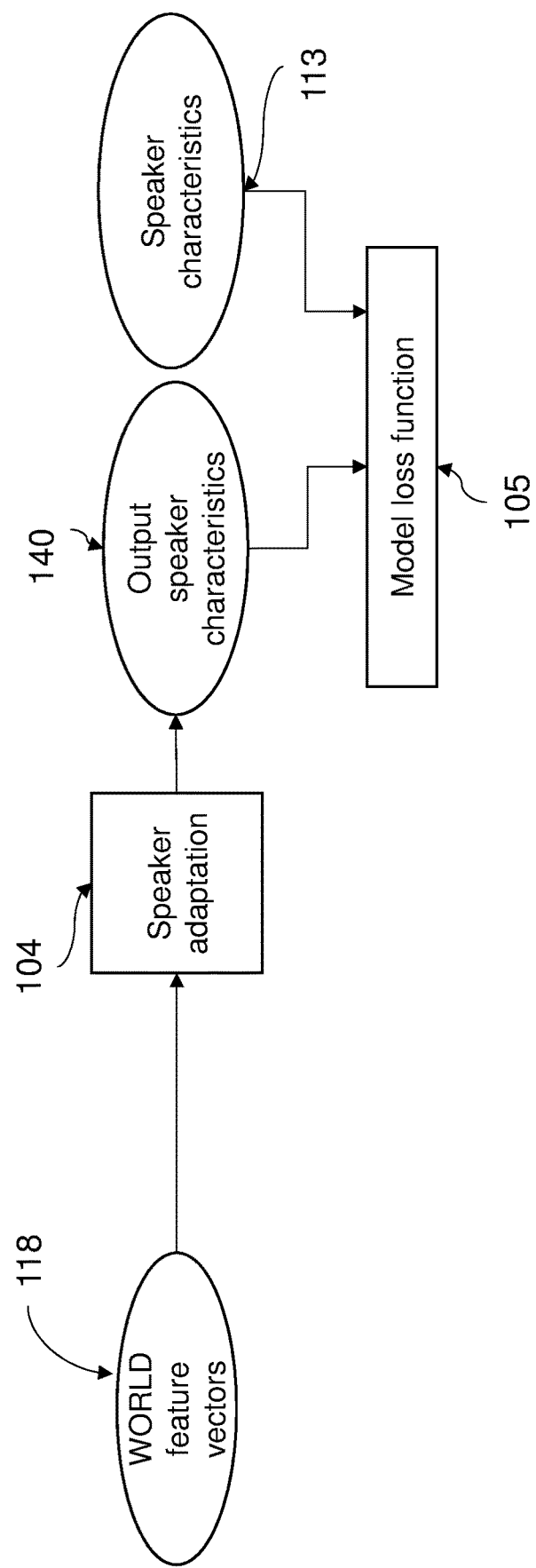
FIG. 8 shows a flow chart of a method of training a system to generate speaker vectors in accordance with an embodiment.

FIG. 8 shows a flow chart of a method of training a system to generate speaker vectors in accordance with an embodiment.

Training of the speaker characteristic adaptation module 104 may be performed after the training of the speech synthesis module 103. The same training data may be used. In this case, the WORLD vectors 118 extracted directly from the speech (and used as the ground truths in training the text to speech system 103) are used as the input to the speaker characteristic adaptation module 104, in the same manner as during operation. The speaker ID 119 and the corresponding trained speaker characteristics 113 determined during training of the speech synthesis system 103 are used as the "ground truths". The training process may also take place through gradient descent methods using back-propagation of error.

The method comprises generating speaker vectors 140 using a first algorithm taking the extracted first feature vectors 118 as inputs. In this case, the extracted first feature vectors are the WORLD vectors 118 extracted directly from the audio signal. The first algorithm comprises the convolution filter bank 402, normalising function 403 and neural network 404 which have been described previously. The WORLD feature vectors 118 are inputted and the algorithm performed in the same manner as during operation, producing an output speaker vector 140.

The output speaker vectors 140 may be used to determine a loss, using the target speaker vectors 113 generated during training of the speech synthesis system 103 as ground truths. The gradient of the loss with respect to each of the trainable parameters of the system can be determined through back-propagation, and used to update the parameters. An example of the loss function that may be used is a mean squared loss E2:

$$L = \frac{1}{M} \sum_{m=1}^{M} \|\hat{x}_m - x_m\|^2$$

where $\hat{x}$ is the speaker vector generated during training of the speech synthesis module 103 of length M, and x is a speaker vector generated from speaker characteristic adaptation module 104 from the input WORLD feature vectors 118, also of length M. In an embodiment, M=64. Instead of a mean-squared error loss function, alternative loss functions may be used.

The parameters of the first algorithm are then updated using the updated speaker vectors 113 generated during training of the second algorithm as ground truths. Thus for a training example in a batch, the gradient of the loss with respect to each of the parameters (i.e. the weights and biases in the neural networks) is calculated, based on the back-propagated error signal and the feedforward activation signals (inputs to each layer). Every operation performed in the forward pass is differentiable and therefore a functional expression for the derivative of the loss with respect to every single parameter (i.e. weights and biases) can be determined by the chain rule. The gradient values are calculated from these expressions using the back-propagated error and the activations (inputs for each layer from the forward pass, cached during the forward pass).

This results in an array of gradient values, each corresponding to a parameter, for each training example in the batch. These are converted to a single gradient value for each parameter (for example by taking the average of the gradient values for all training examples for the particular parameter).

The gradient for each parameter is then used to calculate the updated parameter from the previous values using the optimizer function (i.e. a gradient descent type optimiser function). The input to the optimiser function for each parameter is the previous value, the gradient corresponding value and a learning rate parameter. In general, gradient descent based optimizers update the parameter in the direction of steepest descent of the loss function with respect to the parameter, scaled by a learning rate. The parameters are replaced with the new values and the process iterates with another batch of training signals.

The neural network comprising the convolution filter bank 402, normalising function 403 and neural network 404 is able to capture speaker characteristics 113 across different languages. This is because it is only trained to operate on acoustic, vector representations of the speech input (e.g. WORLD feature vectors) without the use of any language-specific information or lexicon such as graphemic characters. This allows the neural network to extract features through audio alone, which are universal across languages and bypasses the need for bilingual data.

Where CNNs are used, some kind of padding may be used for the inputs in order to standardise input length. In this example, the WORLD feature vectors are inputted into the speaker characteristic adaptation module, which comprises a CNN. In an embodiment, for utterances of differing lengths T in the same batch, any utterance that is shorter than the longest utterance in the batch is zero-padded to the longest length. In a batch of size 3, the first utterance in the batch may have 350 frames of WORLD feature vectors, the second 400 frames, and the third 200 frames. In this case, the first utterance has 50 frames of zero-values appended to its end, in order to have a length of 400 frames, and the third utterance has 200 frames of zero-valued feature vectors appended, also reaching a length of 400 frames. The second utterance is not altered.

Figure 9:
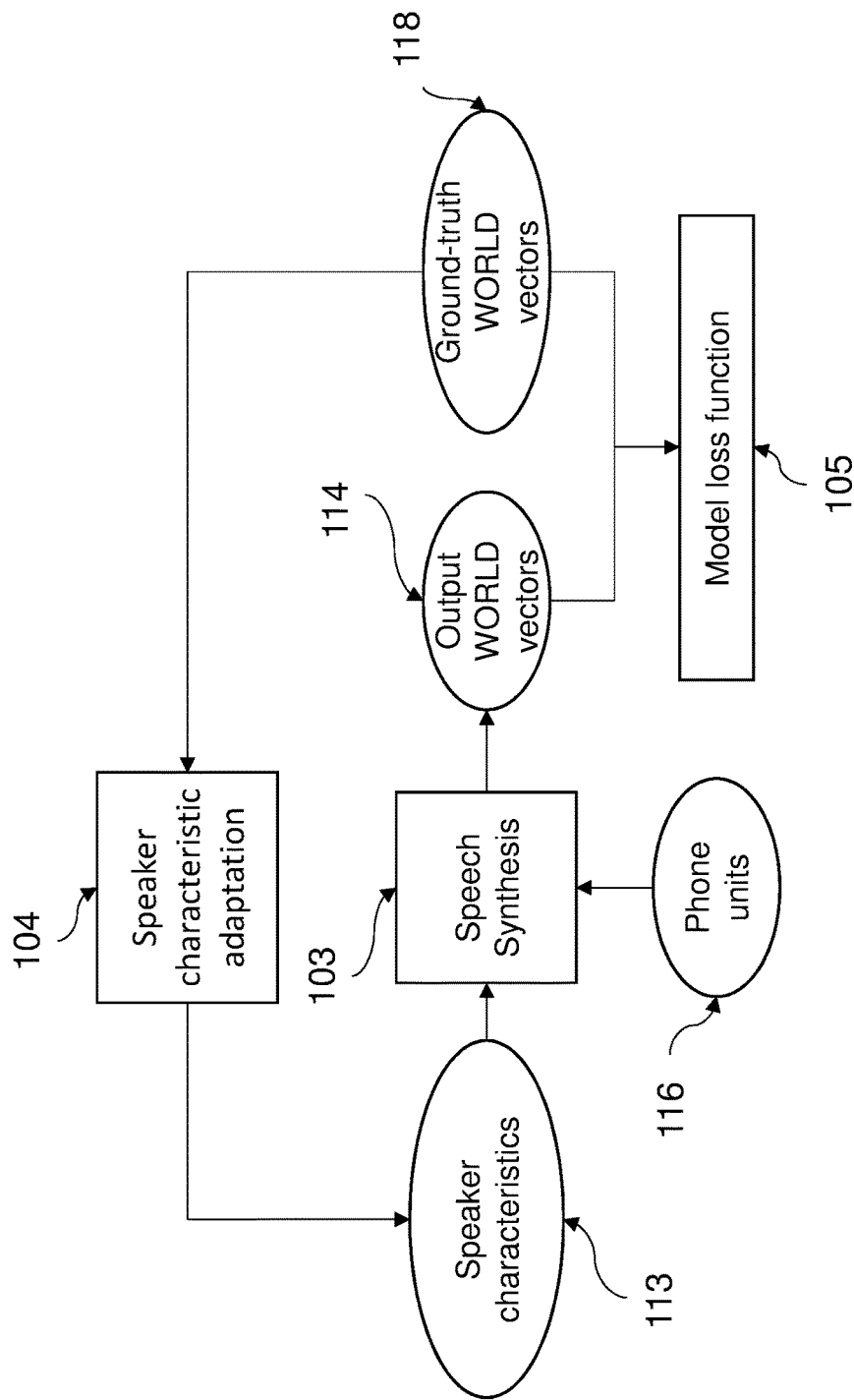
FIG. 9 is a schematic illustration of the stages of a training procedure for training a speech processing system in accordance with an embodiment.

Although in the above, a method of training the speech synthesis module 103 first, and then subsequently training the speaker characteristic adaptation module 104 is described, alternatively it is possible to train both modules together. This is shown schematically in FIG. 9 for example.

In this case, the training of both the speaker adaptation module 104 and the speech synthesis module 103 happens jointly, in an end to end manner. The ground-truth WORLD feature vectors 118 (extracted directly from the audio signal) is input into the speaker adaptation module 104 to produce speaker characteristics 113, which are then input to the speech synthesis system 103, along with the phone sequence 116, to produce output WORLD feature vectors 114. This allows for the compression of the original speech into a sequence of phones, whilst a vector which represents the emotions and intonations of the speech for example is also extracted. This allows both systems to learn to work better with each other.

Figure 10:
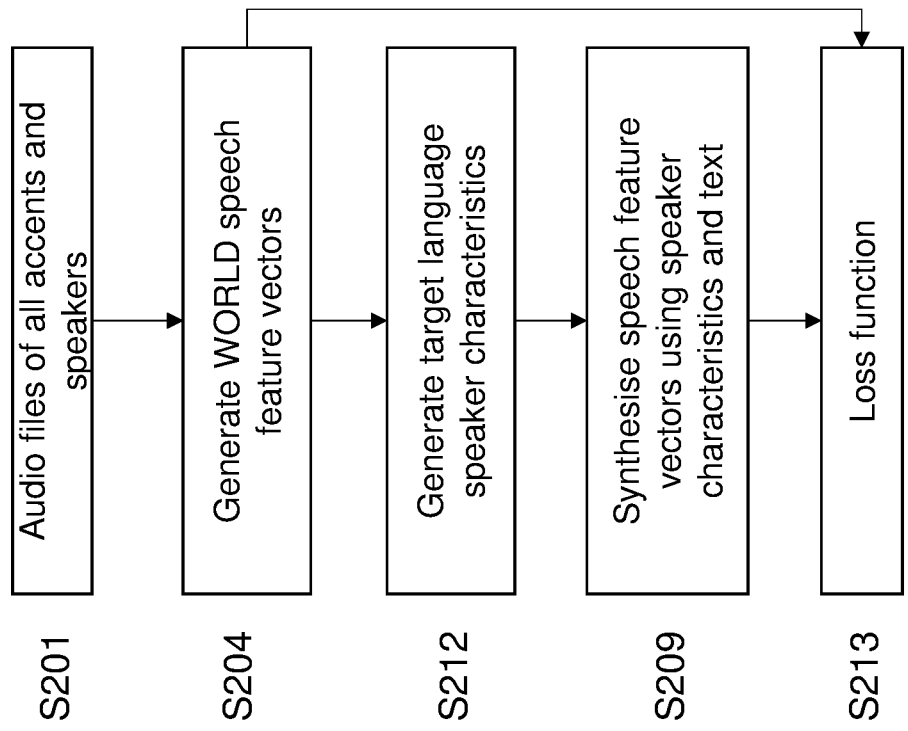
FIG. 10 is a flow chart of a method of training a speech signal processing system in accordance with an embodiment.

FIG. 10 is a flow chart of a method of training a speech signal processing system to generate translated speech in accordance with an embodiment. As has been described above, the training uses a training dataset comprising a plurality of speech signal segments from a plurality of speakers comprising a first language and text information corresponding to the speech signal segments. These are obtained in S201.

In S204, first feature vectors are extracted from the speech signal segments, wherein the first feature vectors comprise information relating to audio data corresponding to the speech signal segment from which the first feature vector was extracted. In this case, WORLD speech feature vectors are extracted from the audio data, in the same manner as during operation.

In S212, speaker vectors are generated using the first algorithm taking the extracted WORLD feature vectors from S204 as inputs, wherein the speaker vectors represent a set of features corresponding to the speaker, in the same manner as during operation.

In S209, WORLD feature vectors are generated using a second algorithm taking the text information as inputs and using the speaker vectors. In this step, the speech synthesis algorithm generates the WORLD feature vectors from the phone information in the same manner as during operation.

Updating of both the first algorithm and the second algorithm to improve the performance, including updating of the speaker vectors is performed in one step. The output WORLD feature vectors 114 may be used to determine a loss 105, using the target WORLD vectors 118 extracted directly from the audio signals as ground truths, in the same manner as described in relation to FIG. 6 above. The gradient of the loss with respect to each of the trainable parameters of the two algorithms, including the speaker characteristics 113, can be determined through back-propagation, where the neural networks and operations used to generate the speaker vectors are simply added to the computational graph, and the parameters updated in the same manner as has been described previously.

Thus for a training example in a batch, the gradient of the loss with respect to each of the parameters (i.e. weights and biases in the neural networks in both the speaker characteristic adaptation module 104 and the speech synthesis module 103, the speaker vectors, etc) is calculated, based on the back-propagated error signal and the feedforward activation signals (inputs to each layer). The gradient for each parameter is then used to calculate the updated parameter from the previous values using the optimizer function (i.e. a gradient descent type optimiser function).

In the above, speaker characteristic vectors representing a set of features corresponding to a speaker are used to generate synthesised speech. During training, each speaker in the training data set has a corresponding speaker vector. Each speaker speaks a number of different sentences, allowing the system to train the speaker vector to capture characteristics corresponding to a speaker. During training, for each speech signal segment for the same speaker, the same speaker vector is used (updated progressively through the training process). During operation, the system can extract speaker vectors from new speakers. In an embodiment, during operation, for each input speech signal segment from the same speaker, the system extracts a speaker vector which is the same to within a tolerance of 5%.

The above described speech synthesis system 103 and speaker characteristic adaptation system 104 may be trained on data in a single language, i.e. the target language. The speech recognition system 101 is trained using speaker signals in the source language. The text to text translation system is trained using corresponding text signals in the source and target languages.

However, it is also possible to train the speech synthesis system 103 and speaker characteristic system 104 for multiple target languages. In this case, the text to text translation system 102 would also need to be trained on the multiple target languages. The speech recognition system 101 and text to text translation systems may also be trained for multiple source languages.

Figure 11:
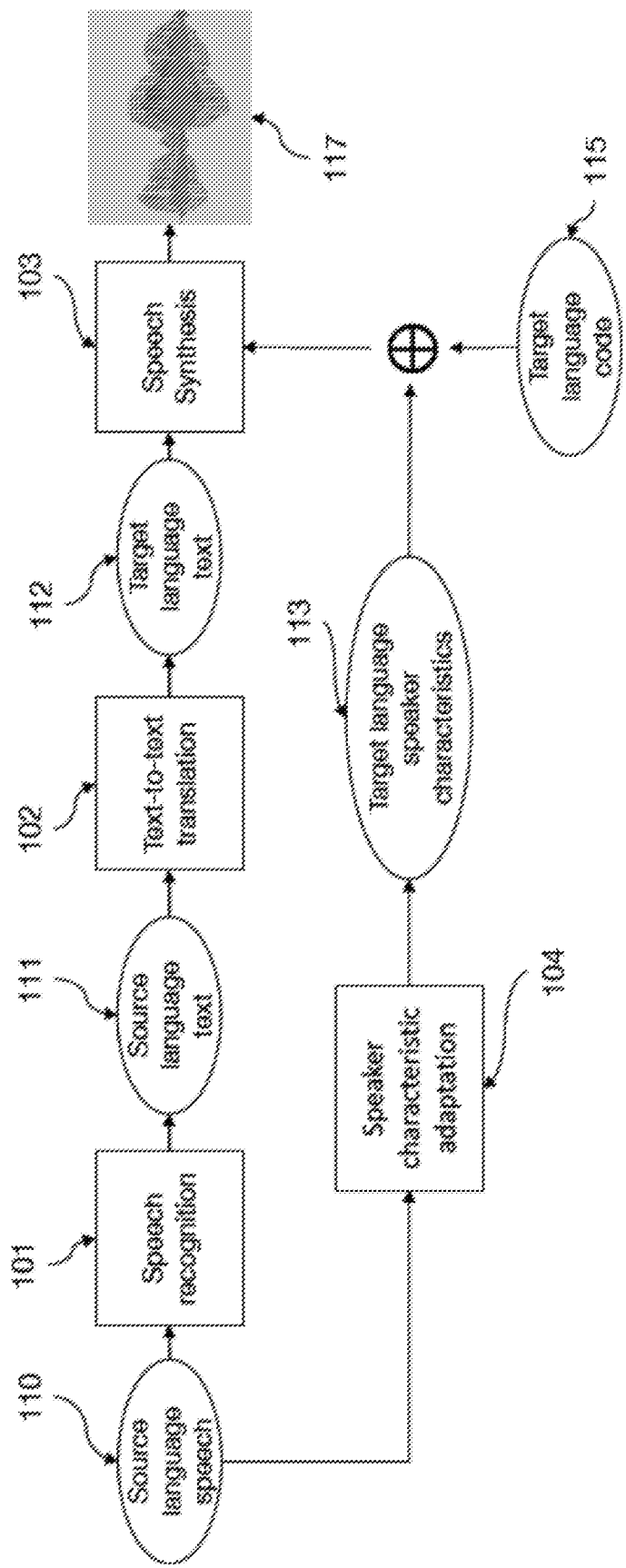
FIG. 11 shows a flow chart illustrating the processing stages included in a speech processing system according to an embodiment.

FIG. 11 shows a flow chart illustrating the processing stages included in a speech processing system according to an embodiment. The system is similar to the system of FIG. 2(*a*), except for the inclusion of the target language characteristics 115, allowing multiple target languages to be used. Description of the elements already described above will therefore be omitted.

In this system, in addition to speaker vectors 113, a target language vector 115 is also incorporated into the speech synthesis system 103. It is combined, for example through simple addition (if they are of the same dimensionality) or concatenation, with the speaker vector 113 to form a more general characteristic vector. This gives the speech synthesis module 103 the ability to output two or more different target languages using the corresponding language characteristic 115.

During operation, the user decides which language they wish to output, i.e. they select a target language from two or more supported target languages. Thus during operation of the system, the user selects the output language they wish to have, and the corresponding language code will be fed into the system. The corresponding language vector 115 is found in a stored look-up table. The speaker vector 113 is generated in the same manner as has been described above. The speaker vector 113 is then combined with the target language vector 115. The combined vector is used in the speech synthesis process in place of the speaker vector 113, i.e. it is used in the same manner as previously described in relation to the speaker vector 113.

The language vectors 115 are learned during the training stage and stored in a look-up table for use during operation. The training for the speech synthesis system 103 therefore incorporates an additional language ID, which in turn corresponds to a language characteristic 115, and uses datasets of more than one language. Training is possible because all of the text 112 from each language is decomposed into a phone sequence 116, where the set of possible phones is language independent.

Figure 12:
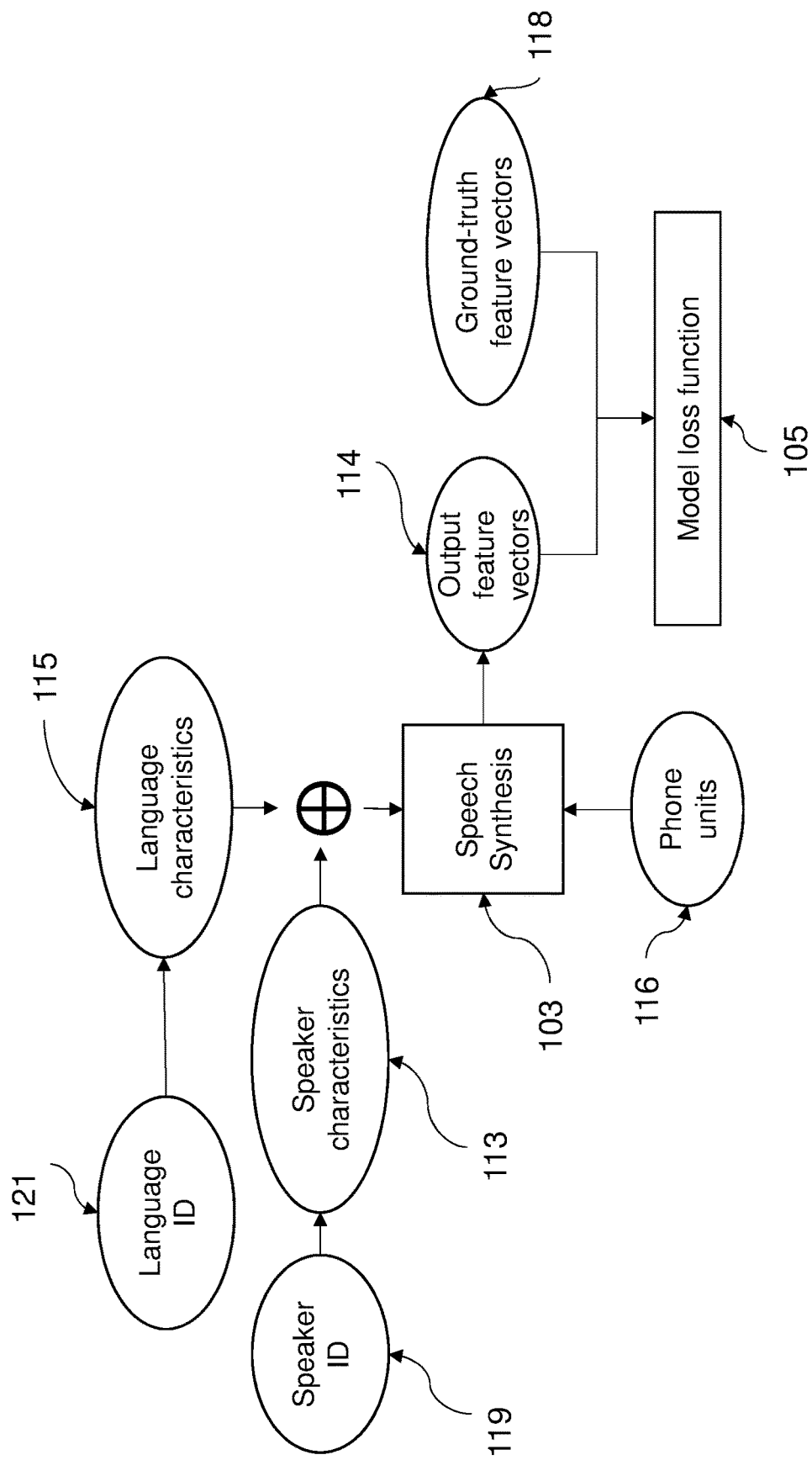
FIG. 12 shows a schematic illustration of a training process in accordance with an embodiment.

FIG. 12 shows a schematic illustration of a training process in accordance with an embodiment. The process relates to training of the speech synthesis module 103 only, after which the speaker characteristic adaptation module 104 may be trained in the same manner as has been described previously. Alternatively however, both modules may be trained together in a joint training step, again as has been described previously.

The training uses a training dataset comprising a plurality of speech signal segments from a plurality of speakers comprising two or more languages and text information corresponding to the speech signal segments. Each example in the training data may contain: the speech audio 117 itself, which are converted to WORLD vectors 118; the corresponding text 112, which are converted to phone units 116 through the grapheme-to-phoneme converter 306; a speaker ID 119 and a language ID 121. Each speaker ID 119 is initially mapped onto a trainable speaker characteristic vector 113. Each speaker ID is stored in a lookup table for example, with the corresponding speaker vector 113. Each language ID 121 is initially mapped onto a trainable language characteristic vector 115. Each language ID is stored in a lookup table for example, with the corresponding language vector 115.

Thus each speaker in the training data set has a corresponding speaker vector 113. For each segment of speech corresponding to the same speaker, the same speaker vector 113 is used, regardless of which language they are speaking. Since different segments of speech corresponding to the same speaker will have the same speaker vector, the speaker vector is independent of the text/word information. Furthermore, since different segments of speech corresponding to the same speaker but in different languages will have the same speaker vector, the language independence may be reinforced.

Each language in the training data set has a corresponding language vector 115. For each segment of speech corresponding to the same language, the same language vector 115 is used, regardless of which speaker is speaking. Since different segments of speech corresponding to the different speakers will have the same language vector, the language vector is independent of the text/word or speaker information.

Training is performed by feeding in the speaker vector 113, language vector 115 and the phone sequence 116 for a segment, producing a sequence of WORLD vector outputs 114 in the same way as has been described above in relation to the operation stage. The output WORLD feature vectors 114 may be used to determine a loss 105, using the target WORLD vectors 118 extracted directly from the audio signals as ground truths. The gradient of the loss with respect to each of the trainable parameters of the speech synthesiser, including the speaker characteristics 113 and language characteristics 115, can be determined through back-propagation.

Thus for a training example in a batch, the gradient of the loss with respect to each of the parameters (i.e. weights and biases in the neural networks, the speaker vectors, language vectors etc) is calculated, based on the back-propagated error signal and the feedforward activation signals (inputs to each layer). Every operation performed in the forward pass is differentiable and therefore a functional expression for the derivative of the loss with respect to every single parameter (i.e. weights, biases, speaker vector values and language vector values) can be determined by the chain rule. The gradient values are calculated from these expressions using the back-propagated error and the activations (inputs for each layer from the forward pass, cached during the forward pass). As has been described previously, a computational graph records where elements were added, and the back-propagation will associate common speaker characteristics to the speaker characteristics, and common language features across different speakers to the language features.

This results in an array of gradient values, each corresponding to a parameter, for each training example in the batch. These are converted to a single gradient value for each parameter (for example by taking the average of the gradient values for all training examples for the particular parameter).

The gradient for each parameter is then used to calculate the updated parameter from the previous values using the optimizer function (i.e. a gradient descent type optimiser function). The input to the optimiser function for each parameter is the previous value, the gradient corresponding value and a learning rate parameter. In general, gradient descent based optimizers update the parameter in the direction of steepest descent of the loss function with respect to the parameter, scaled by a learning rate. The parameters are replaced with the new values and the process iterates with another batch of training signals.

In an embodiment, the language vector may be learnt in the same way as described above for the speaker vectors, however its vectors are far more common than any single speaker vector, since many speakers belong in the same language. During training in a batch, the gradient update to a language vector is obtained through averaging the update for all utterances within the batch that is of the same language, even if each utterance may be of a different speaker.

This means through many iterations the language vectors will be trained to encapsulate the common characteristics from all the utterances of that language from different speakers, and emphasise the differences between different languages. Meanwhile, the speaker characteristic vectors for each speaker will be trained to emphasise the differences of the speaker characteristics, but with a minimised influence from the language that the speaker speaks, since the language information can be obtained through the language characteristics.

In an embodiment, one or more constraints are placed on the language vectors 115 during training, such as that the squared norm of the speaker vectors must be less or equal to unity.

Including a separate language vector enforces that the speaker characteristics 113 drawn from the space $\mathbb{R}^M$ will be compatible with multiple output languages, and the characteristic space is therefore language independent.

The above described system has the ability to generate multiple outputs of different languages at the same time through a batch. During operation, elements within the same utterance may have different language codes, therefore instructing the TTS system 103 to generate different language outputs.

This system may allow a user to have a single input translated into multiple different languages for example. This can be done with improved efficiency, since matrix-matrix calculations are faster on Graphical Processing Units, which are optimised for parallelising such calculations, than performing a sequence of vector-matrix calculations (thus it is faster to generate outputs in a batch, than individually in a sequence). In other words, it is faster to generate two outputs in two different target languages (from a single input) at the same time, in one process, rather than in sequence.

In the above described embodiments, a speaker vector comprising a number of values, each corresponding to a feature, is generated by the speaker characteristic adaptation module 104 and then used directly in the speech synthesis module 103. However, it is also possible to generate a probability distribution corresponding to each feature in the speaker vector using the speaker characteristic adaptation module 104. A speaker vector is then generated from the probability distribution, and used in the speech synthesis module 103.

Figure 13:
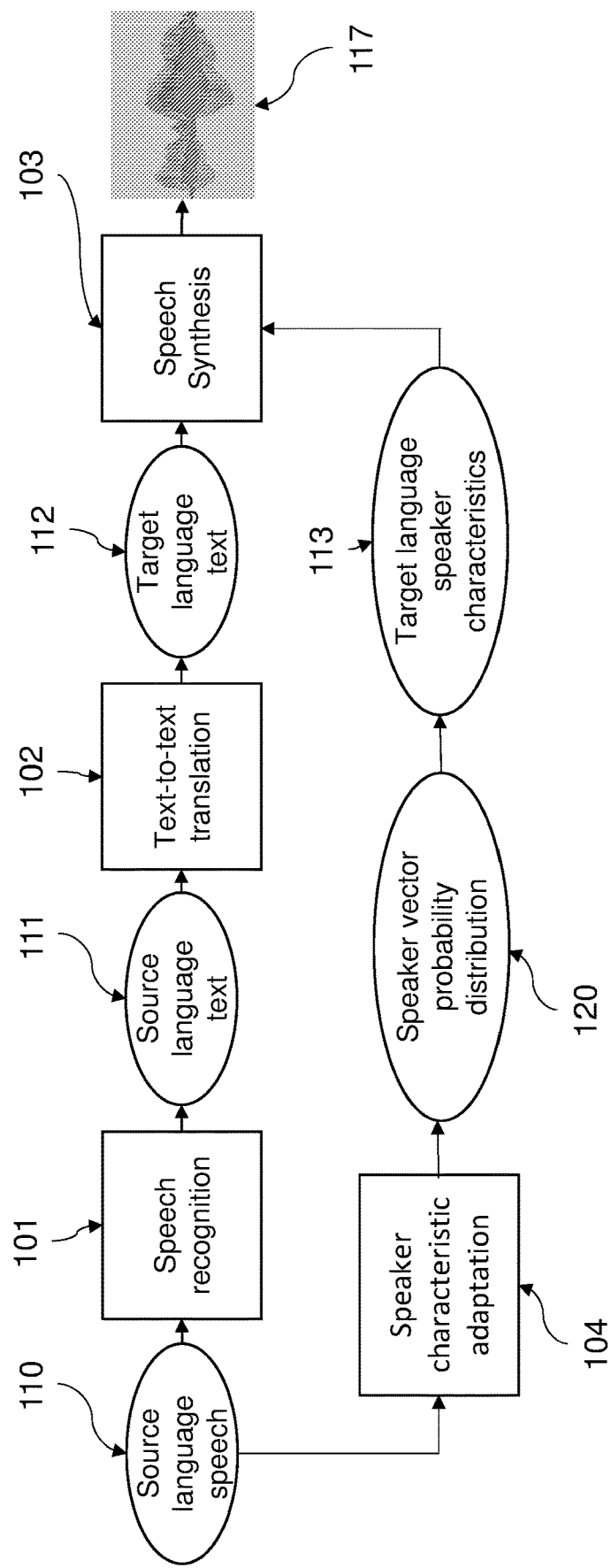
FIG. 13 shows a flow chart illustrating the processing stages included in a speech processing system according to an embodiment.

FIG. 13 shows a flow chart illustrating the processing stages included in a speech processing system according to an embodiment. The system is similar to the system of FIG. 2(a), except for the inclusion of the probability distribution 120 for each feature in the speaker vector 113. Description of the elements already described above will therefore be omitted.

In this embodiment, the first trained algorithm outputs one or more parameters representing a probability distribution 120 for one or more of the features in the speaker vector, and the speaker vector 113 is generated using the probability distribution.

The speaker characteristic adaptation module 104 thus outputs parameters of a probability distribution 120, instead of a fixed speaker vector 113, where the parameters of the distribution are trainable during the training of the speech synthesis module 103, and these parameters are used as the training targets for training the speaker characteristic adaptation module 104. This may provide increased robustness. This may also take into account that at the utterance of each sentence, a speaker should be represented by slightly different characteristics.

In an embodiment, the speaker adaptation module 104 outputs a vector of length 2M. In this example, the output represents the parameters of a multivariate normal distribution (or Gaussian) of dimension M. The first M elements of the output vector represent the mean of the distribution, while the $M+1^{th}$ to the $2M^{th}$ elements represent the diagonals of a covariance matrix $\Sigma$ (Sigma), where all other elements of the matrix are zero. In other words, each speaker vector feature is represented as a Gaussian distribution with a mean p and standard deviation a, the values of which are output by the speaker characteristic adaptation module 104. The standard deviation parameters may also be represented as the variance $\sigma^2$, or the log-variance $2\log(\sigma)$ of the distribution for example.

The value of each feature in the speaker characteristic vector 113 is then drawn randomly from the distribution. The random sample may be drawn from the speaker probability distribution by the process of drawing a random vector of the dimension M from a normal distribution of mean 0 and standard deviation 1, each entry is then multiplied with by a standard deviation a value and the mean μ is added. This is the equivalent of drawing a random vector from a Gaussian with the same mean p and standard deviation a values. The speaker characteristic vector 113 is then used in the speech synthesis step in the same manner as has been described previously.

Figure 14:
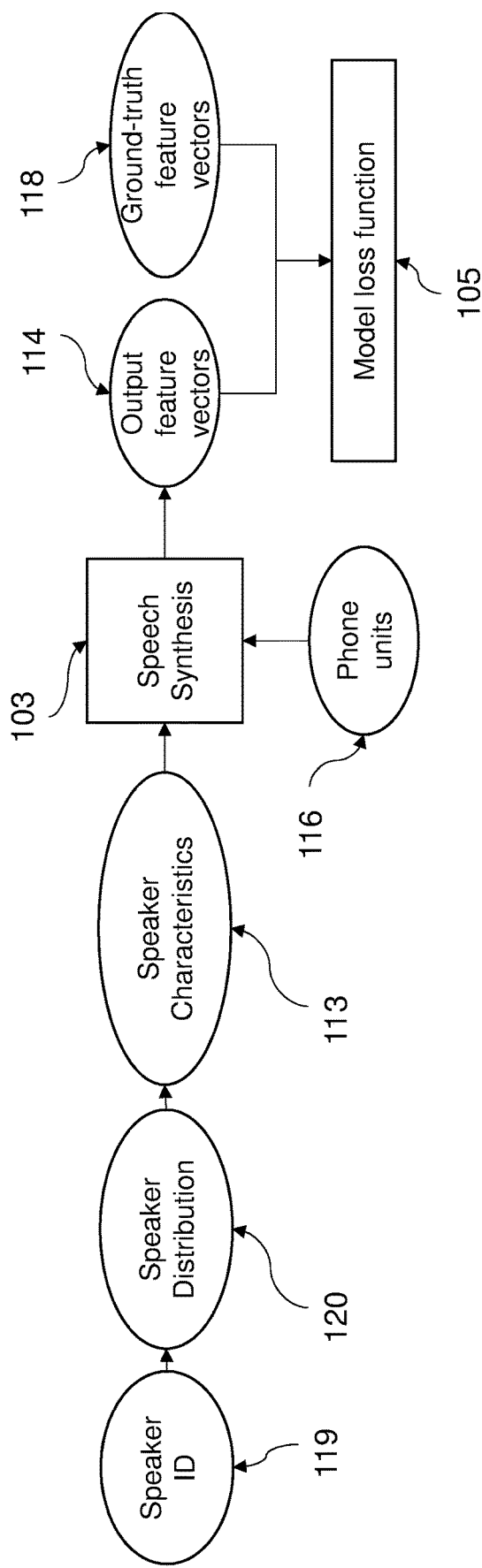
FIG. 14 shows a method of training a speech synthesis system used in accordance with an embodiment.

FIG. 14 shows a method of training a speech synthesis system used in accordance with an embodiment. The training is similar to that described in relation to FIGS. 6 and 7 above, with the addition of the speaker probability distribution, and thus description of the elements already described above will be omitted. Each example in the training data may contain: the speech audio 117 itself, which are converted to WORLD vectors 118; the corresponding text 112, which are converted to phone units 116 through the grapheme-to-phoneme converter 306; and a speaker ID 119. Each speaker ID 119 is initially mapped onto a trainable speaker probability distribution 120. Each speaker ID is stored in a lookup table for example, with the corresponding speaker probability distribution parameters 120, for example the mean and standard deviation corresponding to each feature.

Thus each speaker in the training data set has a corresponding vector of 2M probability distribution parameters 120. For each segment of speech corresponding to the same speaker, the same parameter values 120 are used (updated progressively during training). Since different segments of speech corresponding to the same speaker will have the same parameters, the speaker vector is independent of the text/word information.

Training is performed by feeding in the phone sequence 116 for a segment, generating a speaker vector 113 from the probability distribution parameters 120 in the same manner as during operation, and feeding in the speaker vector 113. A sequence of WORLD vector outputs 114 is then produced by the speech synthesis module 103 in the same way as has been described above in relation to the operation stage. The output WORLD feature vectors 114 may be used to determine a loss 105, using the target WORLD vectors 118 extracted directly from the audio signals as ground truths. The gradient of the loss with respect to each of the trainable parameters of the speech synthesiser, including the speaker probability distribution parameters 120, can be determined through back-propagation, and used to update the parameters.

The random sample is drawn from the speaker probability distribution by the process of drawing a random vector of the dimension M from a normal distribution of mean 0 and standard deviation 1, each entry is then multiplied with by a standard deviation a value and the mean p is added. This is the equivalent of drawing a random vector from a Gaussian with the same mean p and standard deviation a values. This way, the parameters are differentiable for back-propagation, since the speaker characteristics is just the result of a multiplication, between a scalar value and the parameter, and an addition.

At the beginning of training, the speaker characteristic vector probability distribution parameters 120 for each speaker in the training data are randomly initialised (along with the other trainable parameters).

Thus for a training example in a batch, the gradient of the loss with respect to each of the parameters (i.e. weights and biases in the neural networks, the speaker vector probability distribution parameters 120, etc) is calculated, based on the back-propagated error signal and the feedforward activation signals (inputs to each layer). Every operation performed in the forward pass is differentiable and therefore a functional expression for the derivative of the loss with respect to every single parameter (i.e. weights, biases, speaker vectors probability distribution parameter 120s) can be determined by the chain rule. The gradient values are calculated from these expressions using the back-propagated error and the activations (inputs for each layer from the forward pass, cached during the forward pass). This may be done in the same manner as has been described previously.

This results in an array of gradient values, each corresponding to a parameter, for each training example in the batch. These are converted to a single gradient value for each parameter (for example by taking the average of the gradient values for all training examples for the particular parameter). The gradient for each parameter is then used to calculate the updated parameter from the previous values using the optimizer function (i.e. a gradient descent type optimiser function). The input to the optimiser function for each parameter is the previous value, the gradient corresponding value and a learning rate parameter. In general, gradient descent based optimizers update the parameter in the direction of steepest descent of the loss function with respect to the parameter, scaled by a learning rate. The parameters are replaced with the new values and the process iterates with another batch of training signals.

Once the training of the speech synthesis system 103 is complete, and the finalised speaker vector probability distribution parameters 120 are generated (i.e. the vector of length 2M corresponding to each speaker in the training data set, comprising for example the mean and standard deviation values corresponding to each speaker feature in the speaker vector 113), these can then be used to train the speaker characteristic adaptation module 104 to generate speaker vector probability distribution parameters 120. This is done in the same manner as has been described previously in relation to training the speaker characteristic adaptation module 104 to generate the speaker vectors 113 themselves. The speaker vector probability distribution parameters 120 obtained from training the speech synthesis system 103 are used as ground truths.

Instead of a mean-squared error loss function, alternative loss functions may be used during training of the speaker adaptation module 104. For example, a distance measure between two distributions, such as the KL-Divergence, can be used as the loss function for training of the speaker adaptation module 104.

In the above described method, during training of the text to speech system 103, speaker vector probability distribution parameters 120 are updated. These are then used to train the speaker adaptation module 104 to generate speaker vector probability distributions 120. In an alternative embodiment however, the text to speech system may be trained in the same manner as described in relation to FIGS. 6 and 7, where the speaker vectors 113 themselves are updated, and no probability distribution parameters are used. In this case, it is still possible to train the speaker characteristic adaptation module 104 to generate probability distribution parameters 120 for the speaker vectors, by using the speaker vectors 113 generated by the training of the text to speech system as ground truths and an alternative loss function. For example, if only fixed speaker characteristics are obtained from the TTS training stage, a negative log-likelihood between the output probability distribution, and the trained speaker vector 113 as the measure of loss may be used during the training of the speaker adaptation module 104.

In the above, a normal or Gaussian distribution, characterised by a mean and standard deviation parameter for example, has been used. In this case, for M speaker features, 2M parameters are output (a mean and standard deviation value corresponding to each feature). Alternatively however, the speaker adaptation module 104 may output a vector of length 3KM. This vector represents the parameters of a Mixture of Gaussians, with K mixtures. For each feature (where M is the number of features), there are 3K scalar parameters, comprising a mean p, standard deviation (or a variant of the standard deviation as discussed above) a and a scaling parameter $\pi_k$ for each of the K distributions. In this case, a mixture is represented by the equation E1 below:

$$P(x) = \frac{1}{\sum_{k=1}^{K} \pi_k} \sum_{k=1}^{K} \pi_k P(x \mid \mu_k, \sigma_k)$$

for a particular feature x in the speaker vector. Here, instead of a single Gaussian, each speaker is represented by K Gaussian distributions for each feature, each with its own mean and standard deviation, and each of which is weighted by a parameter $\pi_k$, where the sum of the various distributions is normalised to unity (one). As described above, the speaker characteristic vector 113 is then drawn from the described distribution.

In the above, speaker characteristic vectors representing a set of features corresponding to a speaker are used to generate synthesised speech. These are drawn from a probability distribution corresponding to each feature in the speaker vector, characterised by one or more parameters. During training of the speech synthesis system, each speaker in the training data set has a corresponding speaker vector or speaker vector probability distribution defined by parameters. Each speaker speaks a number of different sentences, allowing the system to train the speaker vector (or the parameters) to capture characteristics corresponding to a speaker.

A speaker characteristic adaptation module is then trained to generate the speaker vector probability distribution parameters using the trained speaker vector or speaker vector probability distribution parameters. During training, for each speech signal segment for the same speaker, the same speaker vector or speaker vector probability distribution parameters, are used (updated progressively through the training process). During operation, the system can extract speaker vector probability distribution parameters from new speakers, and use this to generate a speaker vector. In an embodiment, during operation, for each input speech signal segment from the same speaker, the system extracts speaker vector probability distribution parameters which are the same to within a tolerance of 5%.

In the above described embodiments, the speaker characteristic vector 113 corresponds to an input sentence utterance 110. In other words, there is a single vector of values (or probability distribution values) corresponding to each sentence. However, in an alternative embodiment, an input sentence utterance 110 is not represented by a single speaker vector or single probability distribution, but by a sequence of vectors (or probability distributions) corresponding to each input word in the sentence.

Figure 15:
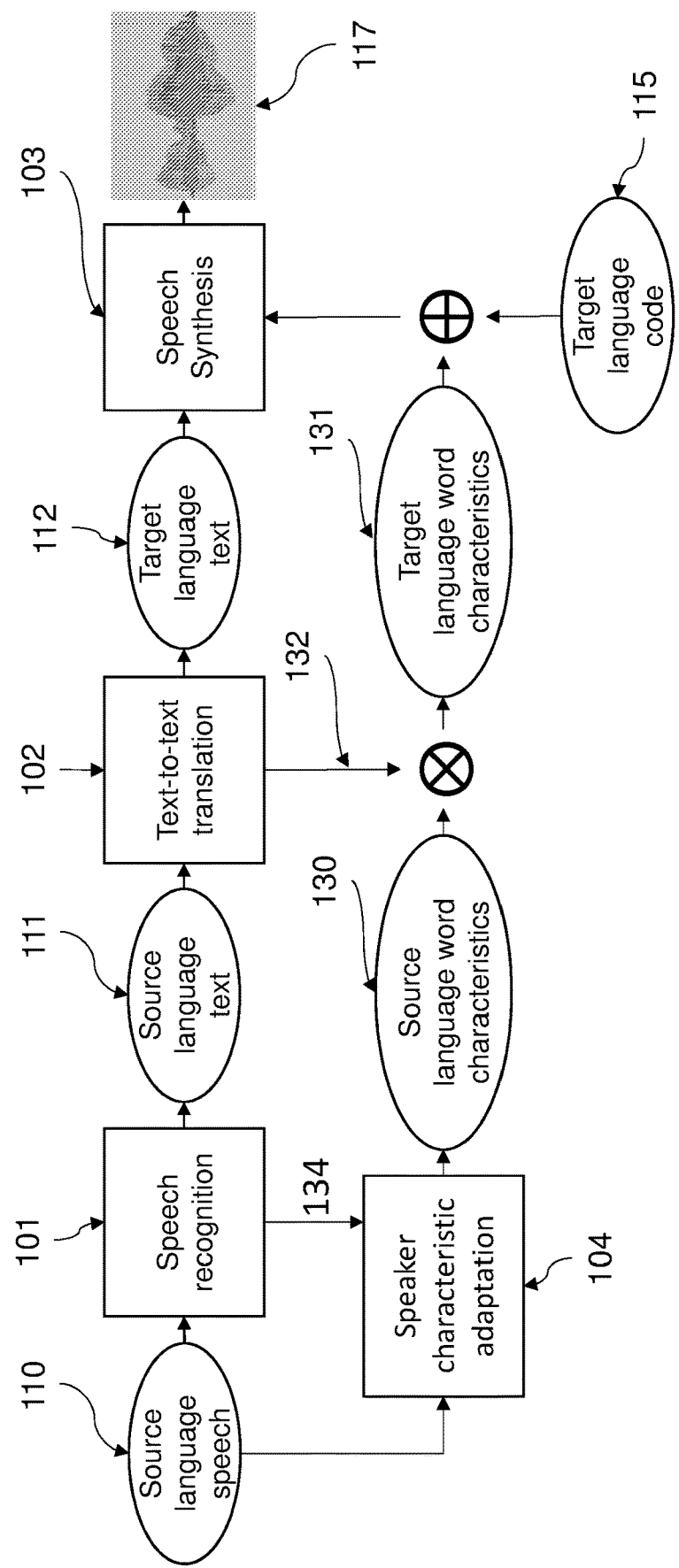
FIG. 15 shows a flow chart illustrating the processing stages included in a speech processing system according to an embodiment.

FIG. 15 shows a flow chart illustrating the processing stages included in a speech processing system according to an embodiment. The system is similar to the system of FIG. 2(*a*), except for the use of the "per word" speaker characteristic vectors. Description of the elements already described above will therefore be omitted.

Timing information 134 of the source language text 111 may be obtained from the speech recognition system 101. The timing information indicates which frames of the audio signal corresponds to each word. The utterance is fed into the trained speaker adaptation system 104 to obtain the per word source language characteristics 130. In other words, a first feature vector, for example a WORLD feature vector, is extracted from each frame of the speech signal corresponding to a word in the utterance. These are fed into the first trained algorithm which generates a speaker vector, representing a set of features corresponding to a speaker, corresponding to the word. This is repeated for each word in the utterance, producing the source language word characteristics 130. The source language word characteristics 130 comprise a speaker vector corresponding to each word in the source language segment, in other words a sequence of speaker vectors.

Figure 16:
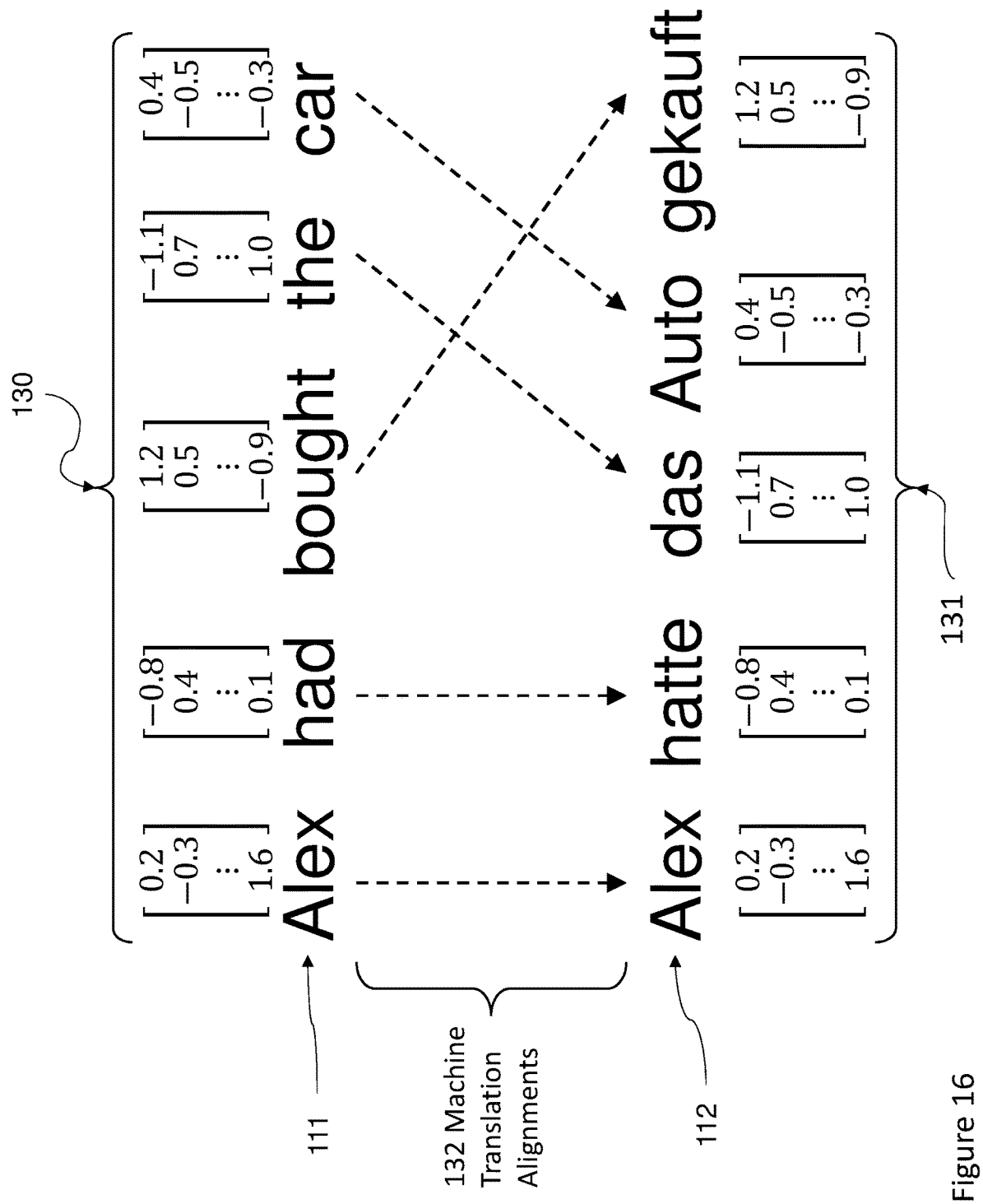
FIG. 16 shows the alignment between each word in the source language utterance and each word in the target language utterance.

The text to text machine translation system 102 outputs alignments 132, corresponding to information indicating the alignment of words in the input text with words in the output text. This is illustrated schematically in FIG. 16 for example. FIG. 16 shows the alignment between each word in the source language utterance "Alex had bought the car" with each word in the target language utterance "Alex hatte das Auto gekauft". This is possible using phrase-based machine translation systems directly as well as using neural machine translation systems, through the weighting of attention mechanisms for example.

The sequence of speaker characteristic vectors 130 corresponding to the source language word order are then reordered using the alignments 132 to obtain the correct alignment for the target language text 112. Thus a sequence of speaker characteristic vectors 131 corresponding to the word order of the target language text is obtained, referred to as the per word target language characteristics 131.

During speech synthesis, the sequence of characteristics 131 is then fed into the TTS module 103 as it generates the WORLD feature vectors. Since the sequence of characteristics correspond to the words, they can be mapped onto the sequence of phones, as the words map to the phones in a monotonic fashion, i.e. the first word may map to the first 3 phones, then second word maps to the $4^{th}$ to the $6^{th}$ phone, the third word maps to the $7^{th}$ to the $8^{th}$ phone and so on, and the speaker characteristic vector for each word is mapped onto the corresponding phones accordingly.

The sequence of characteristics for each phone is also weighted by the weights produced by the attention mechanism 303. Thus for each output frame, a new speaker characteristic vector is generated by taking a weighted sum of the speaker vectors in the sequence. In an embodiment, the speaker characteristic vectors generated by the speaker characteristic adaptation module 104 are the same length as the attention vector (thus M=H). The dot product of the attention vector (of length H=M) with each speaker vector (each of length H=M) is taken, which gives a sequence of scalars (one number corresponding to each speaker vector). These are used as the weights. Each speaker vector is then multiplied by its corresponding weight, and the resulting weighted vectors (of length H) are summed. This weighted sum is then used as the speaker characteristic vector for the frame in the same way as before, for example by being concatenated with the memory module contents and inputted to the second decoder neural network.

In an alternative embodiment, the same weights may be used for the speaker vectors and the representational vectors. In this case, each representational vector (with length H) is concatenated with the corresponding speaker vector (with length M, which may be different to H), to generate a plurality of new concatenated vectors, one for each representational vector. The attention vector generated by the attention mechanism 303 in this case is of length M+H. The dot-product of the attention vector with each of the concatenated vectors is taken to obtain the sequence of weights, one for each concatenated vector (i.e. representational vector concatenated with the corresponding speaker vector, where more than one representational vector may be concatenated with the same speaker vector, since each speaker vector may correspond to more than one phone). These weights are then used to obtain the weighted sum of the representational vectors for the frame, and also the weighted sum of the speaker vectors for the frame (where speaker vectors corresponding to more than 1 representational vector are included in the sum more than once, each time with the weight corresponding to the different concatenated vector). The weighted sum is then used as the speaker characteristic vector for the frame in the same way as before.

This allows expression of a different characteristic for each word, meaning that emphasis on certain words in the source speech 110 can be carried over to the target output 117. In an embodiment, during operation, for each input speech signal segment from the same speaker for the same word, the system extracts a speaker vector which is the same to within a tolerance of 5%.

Training of the system is performed in the same as has been described previously (i.e. with utterance level speaker vectors). However during operation the speaker characteristics are generated on a word level, capturing different characteristics within a sentence, such as emphasis on certain words by being louder, quieter, deeper, lighter. The training may be performed using probability distributions, e.g. using maximum likelihood between a distribution and a vector or using KL-divergence between two distributions.

Figure 19:
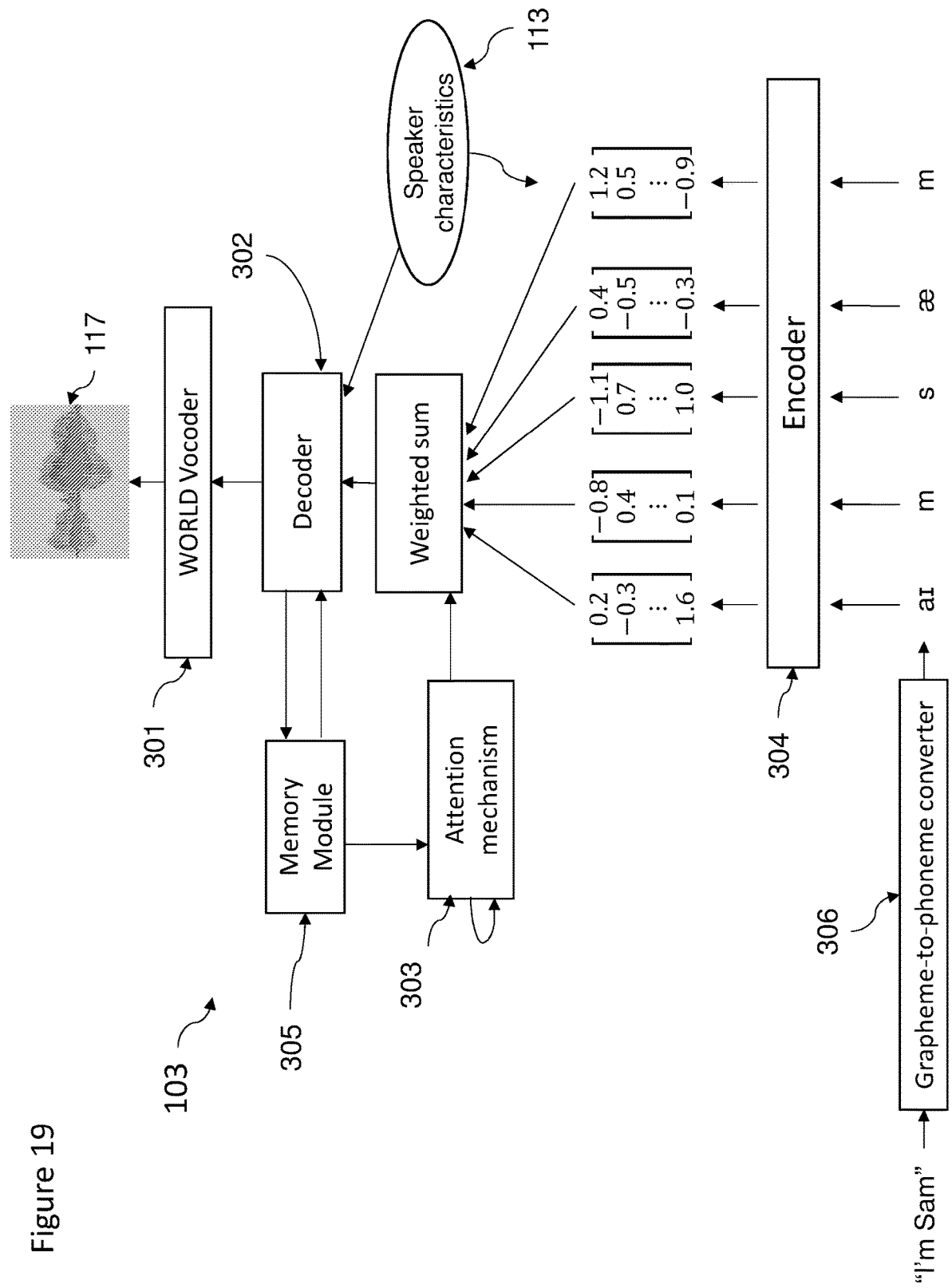
FIG. 19 shows a schematic illustration of a speech synthesis module used in a speech processing system in accordance with an embodiment.

FIG. 19 shows a schematic illustration of an alternative speech synthesis module (or TTS system) 103 according to an embodiment. The system is similar to the system of FIG. 4, except that, in addition to where the speaker vectors are used in FIG. 4, they are also concatenated with each of the encoder outputs (i.e. each of the representational vectors). Description of the elements already described above will therefore be omitted. In this embodiment, the speaker vector can more directly influence the attention mechanism 303 to control aspects such as speed of pronunciation (controlled by how fast the attention weights scan through the input).

In this embodiment, the phone sequence is converted into a sequence of representational vectors (each of length H) as has been described previously. The speaker vector for the utterance (of length M) is then concatenated with each representational vector, to give a sequence of vectors, each of length (H+M).

In an alternative embodiment, the speaker vectors are concatenated with the encoder inputs.

For each output frame, the attention mechanism 303 generates an output attention vector as has been described previously. In this embodiment, the attention vector is of length H+M.

A weighted sum of the vectors (each vector being a representational vector concatenated with the speaker vector, and each being of length H+M) using weights generated from the attention vector is taken and fed into the first decoder neural network. The dot product of the attention vector (of length H+M) with each concatenated vector (each of length H+M) is taken, which gives a sequence of scalars (one number corresponding to each concatenated vector). These are used as the weights. Each concatenated vector is then multiplied by its corresponding weight, and the resulting weighted vectors (of length H+M) are summed. The result of this is fed into the first decoder neural network. The first decoder neural network outputs a vector of length P as before, which is written into the memory module 305.

In embodiments in which a language vector is used as well as a speaker vector, as has been described previously, during operation the language vector is combined with the speaker vector. The resulting vector is then used in the same manner.

Figure 20:
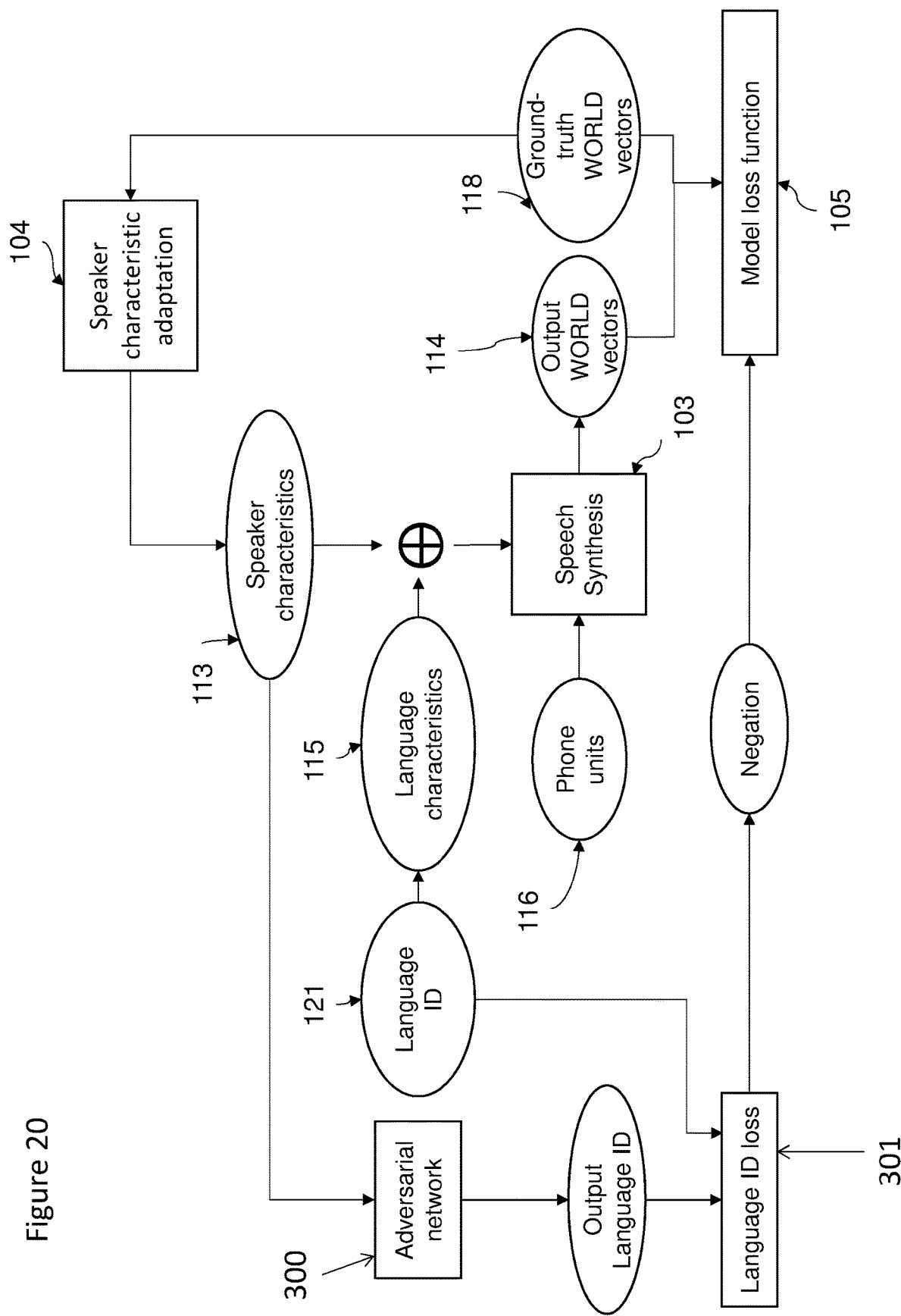
FIG. 20 shows a schematic illustration of a method of training a speech signal processing system according to an embodiment.

FIG. 20 shows a schematic illustration of an alternative method of training a speech signal processing system according to an embodiment. The method is similar to that described in relation to FIG. 12, except that an adversarial network is included as will be described below. Description of the elements already described above will therefore be omitted.

In this method, the speech synthesis system 103 and speaker characteristic adaptation system 104 are trained together, as has been described previously in relation to FIG. 9. The further inclusion of the language vectors, as has been described previously in relation to FIGS. 11 and 12, allows multiple target languages to be used. In this embodiment therefore, a multilingual speech synthesis system and the speaker adaptation system are trained together as a joint system. The text-to-speech system 103 uses a language characteristic feature, or language vector, identified by a Language ID, and a speaker vector that is generated by the speaker adaptation system 104. The language ID is an example of information identifying the speech signal segments comprising the same language.

As has been described previously, during operation, the user selects the output language, and the corresponding language vector 115 is found in a stored look-up table. The language vectors 115 are learned during the training stage and stored in a look-up table for use during operation. The training stage will now be described.

During the method of training according to this embodiment, an additional feed-forward neural network, referred to as the adversarial network 300, takes in the speaker vectors (without the language vectors) as input, and is trained to classify the language to which the input speech belongs (from the input speaker vector). The adversarial network 300 receives the input speaker vector (of length M) corresponding to an utterance and outputs a language ID.

The dimension of the language ID depends on the number of languages. In the general case, where the number of languages is more than 2, the language ID is represented as a vector, where each element corresponds to a specific language, where that element is unity if it is the language being used. For example, if the available languages are English, Spanish and French, in that order, then the language ID for English would be [1, 0, 0], Spanish [0, 1, 0] and French [0, 0, 1]. These are called one-hot vectors, since one element is unity and the rest are zero. The adversarial network 300 in this case may be a feed-forward neural network, with for example 2 hidden layers with, for example, 128 units each, and an output layer with a softmax output function and L nodes, corresponding to the L languages.

In the specific case of just two languages, it becomes a binary classification problem (the language ID can be 0 or 1) so the language ID may be a single scalar value. In this case, the output layer only outputs one value and has 1 output node. To ensure the output is between 0 and 1, a sigmoid activation function is used in this layer.

When the speaker adaptation system 104 and speech synthesis system 103 are jointly trained, some language dependence may arise in the speaker vector, even where a separate language vector feature is used. Using the adversarial network 300 may mitigate any language dependence of the speaker vectors. If the speaker vectors are truly language independent, then the adversarial network 300 will not be able to predict the language ID from the input speaker vector. Thus the loss 301 (determined from the actual language ID as ground truth) will be higher the more language independent the speaker vector.

The negative of the loss function 301 of the adversarial network is therefore added onto the loss function 105 of the speech synthesis system 103 and speaker adaptation system 104. As such, the adversarial network 300 learns to infer the language ID using whatever language information exists within the speaker vectors, while the joint speaker adaptation 104 and speech synthesis 103 system learns to produce speaker vectors that are more language independent. The speech system and adversarial network 300 are trained iteratively to act against each-other.

In embodiments where the speaker adaptation system 104 and speech synthesis system 103 are not jointly trained, the adversarial network 300 can still be used to enforce language-independence in the speaker vectors in a similar manner.

The training occurs in two phases for each batch (since the adversarial network cannot train using the "negative" loss used to train the speech synthesis system 103 and the adaptation system 104, and therefore trains in a separate step).

Figure 21A:
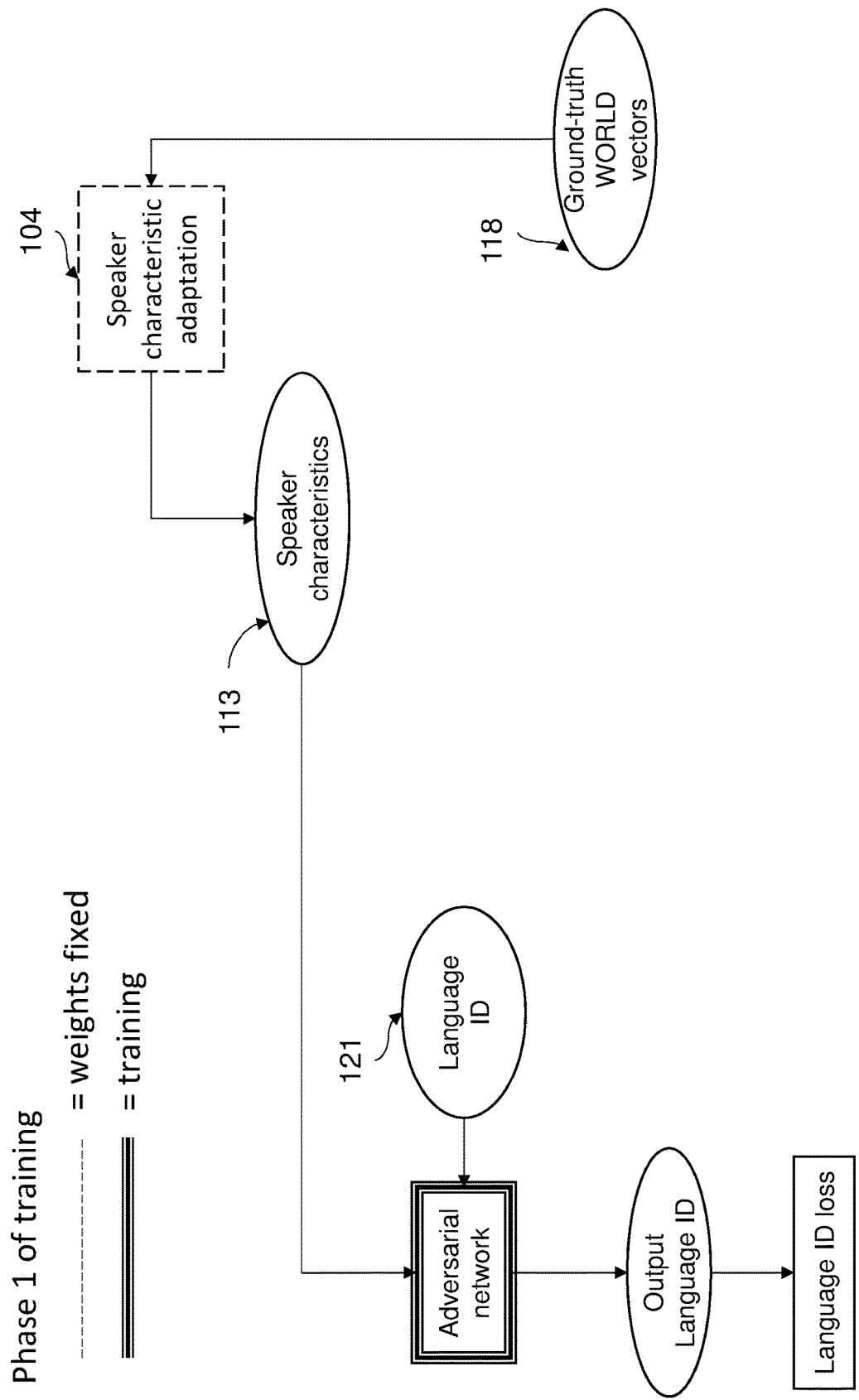
FIG. 21(a) shows a schematic illustration of phase 1 of the training method of FIG.
Figure 21B:
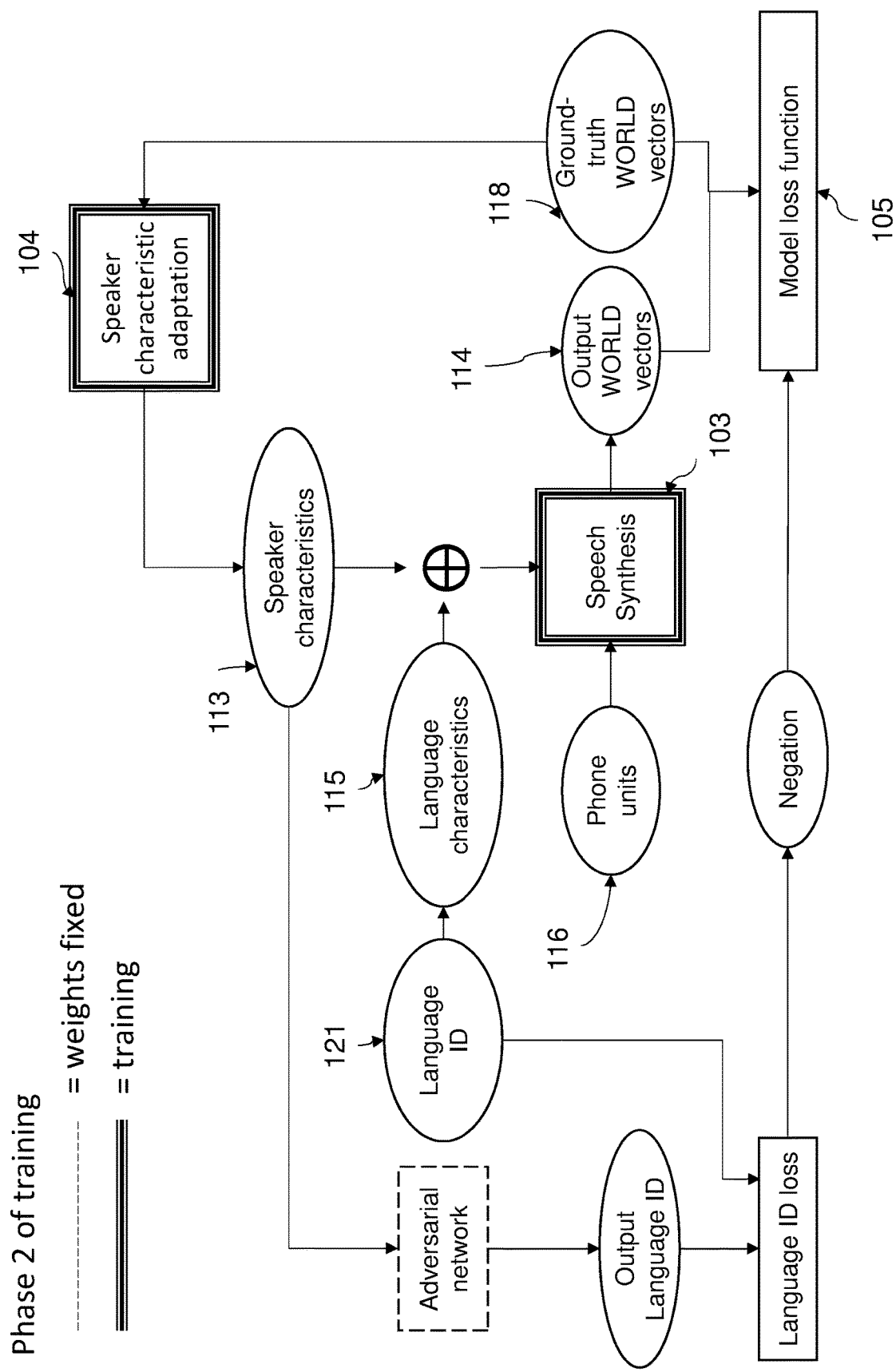
FIG. 21(b) shows a schematic illustration of phase 2 of the training method of FIG. 20.

In phase 1, shown in FIG. 21(*a*), the speaker adaptation system 104 takes in WORLD feature vectors corresponding to each frame in an utterance, to generate speaker characteristic vector S (in the manner described previously). This speaker vector is then fed into the adversarial network 300, which outputs a language ID. The output language ID may be used to determine a language ID loss 301, using the language ID in the original dataset as ground truth. The gradient of the loss 301 with respect to each of the trainable parameters of the adversarial network 300 can be determined through back-propagation. This is repeated for each utterance in the batch, resulting in an array of gradient values, each corresponding to a parameter, for each training example in the batch. These are converted to a single gradient value for each parameter (for example by taking the average of the gradient values for all training examples for the particular parameter). The gradient for each parameter is then used to calculate the updated parameter from the previous values using the optimizer function. The parameters of the adversarial network 300 are replaced with the new values.

Thus the parameters (i.e. the weights) of the adversarial network 300 are optimised using one step of backpropagation, while the rest of the weights in the speaker adaptation 104 and speech synthesis modules 103 are fixed.

In the second phase, shown in FIG. 21(*b*), the speaker characteristic vectors S generated for each utterance in the first phase are fed into the speech synthesis system 103 to obtain the mean squared loss as has been described previously. For each utterance in the same batch used for the first phase, the speaker vector 113 is combined with the language vector 115 (identified by the language ID in the dataset, not the language ID generated by the adversarial network 300). This combined vector is inputted into the speech synthesis system 103 together with the phone units 116 generated from the dataset to output the WORLD feature vectors, as has been described previously. A mean squared error loss 105 is calculated using the WORLD vectors extracted directly from the data set, as has been described previously.

The speaker vectors 115 are also inputted into the updated adversarial network 300 again, to output an updated language ID loss 301 for each utterance. The negative of the updated language ID loss 301 is added to the mean squared loss 105 for each utterance, and back-propagation is performed on the combined loss function for each utterance to obtain gradient updates for the synthesis system 103 and the speaker adaptation system 104.

In an embodiment in which only two languages are used, the loss function 301 for the adversarial network 300 used in phase 1 of the training may be the binary cross-entropy loss function:

$$L_{tan} = -(1-\hat{l})\log(1-l) - \hat{l}\log(l)$$

where $\hat{l}$ is the True Language ID from the data set, being either 1 or 0 representing the two languages (e.g. 1 is English, 0 is Spanish) and l is the predicted language ID output by the adversarial network 300, for one utterance in the batch. In this case, l is a scalar value between 0 and 1. l represents the probability of the language being language "1", and conversely 1-l represents the probability of the language being language "0". The output layer only outputs one value, and to ensure the output is between 0 and 1, a sigmoid activation function may be used in this layer for example.

The complete loss term 105 used in phase two of the training, in the case of two languages, becomes:

$$L_{synthesis} = (1-\hat{l})\log(1-l) + \hat{l}\log(l) + \frac{1}{NT}\sum_{n=1}^{N}\sum_{t=1}^{T}\|\hat{y}_{t,n} - y_{t,n}\|^2$$

Thus for a training example in a batch, the gradient of the above loss with respect to each of the parameters (i.e. weights and biases in the neural networks, the speaker vectors, language vectors etc.) is calculated. Gradients are not calculated for the parameters of the adversarial neural network 300 in this step. As has been described previously, a computational graph may record where elements were added, and be used to determine the gradient values. The output function of the computational graph at each time step is the loss function at the time step t. For parameters used across the time steps, an average of the gradient values for the time steps is taken.

This results in an array of gradient values, each corresponding to a parameter, for each training example in the batch. These are converted to a single gradient value for each parameter (for example by taking the average of the gradient values for all training examples for the particular parameter). The gradient for each parameter is then used to calculate the updated parameter from the previous values using the optimizer function (i.e. a gradient descent type optimiser function).

In an embodiment where more than two languages are used, the cross-entropy loss 301 becomes:

$$L_{tan} = -\sum_i \hat{l}_i \log(l_i)$$

where $\hat{l}_i = 1$ when the target language is the i-th language and 0 otherwise, and $l_i$ is the predicted probability of the language being the i-th language. For the case of more than 2 languages, L is a vector of length B, where B is the number of possible output languages. The i-th element corresponds to the i-th Language. The value of the i-th element is the probability that the i-th language is the language used. The values of all the elements sum to 1.

The complete, combined loss function 105 in this case is:

$$L_{synthesis} = \sum_i \hat{l}_i \log(l_i) + \frac{1}{NT}\sum_{n=1}^{N}\sum_{t=1}^{T}\|\hat{y}_{t,n} - y_{t,n}\|^2$$

The training is performed in the same manner as has been described previously.

Figure 23:
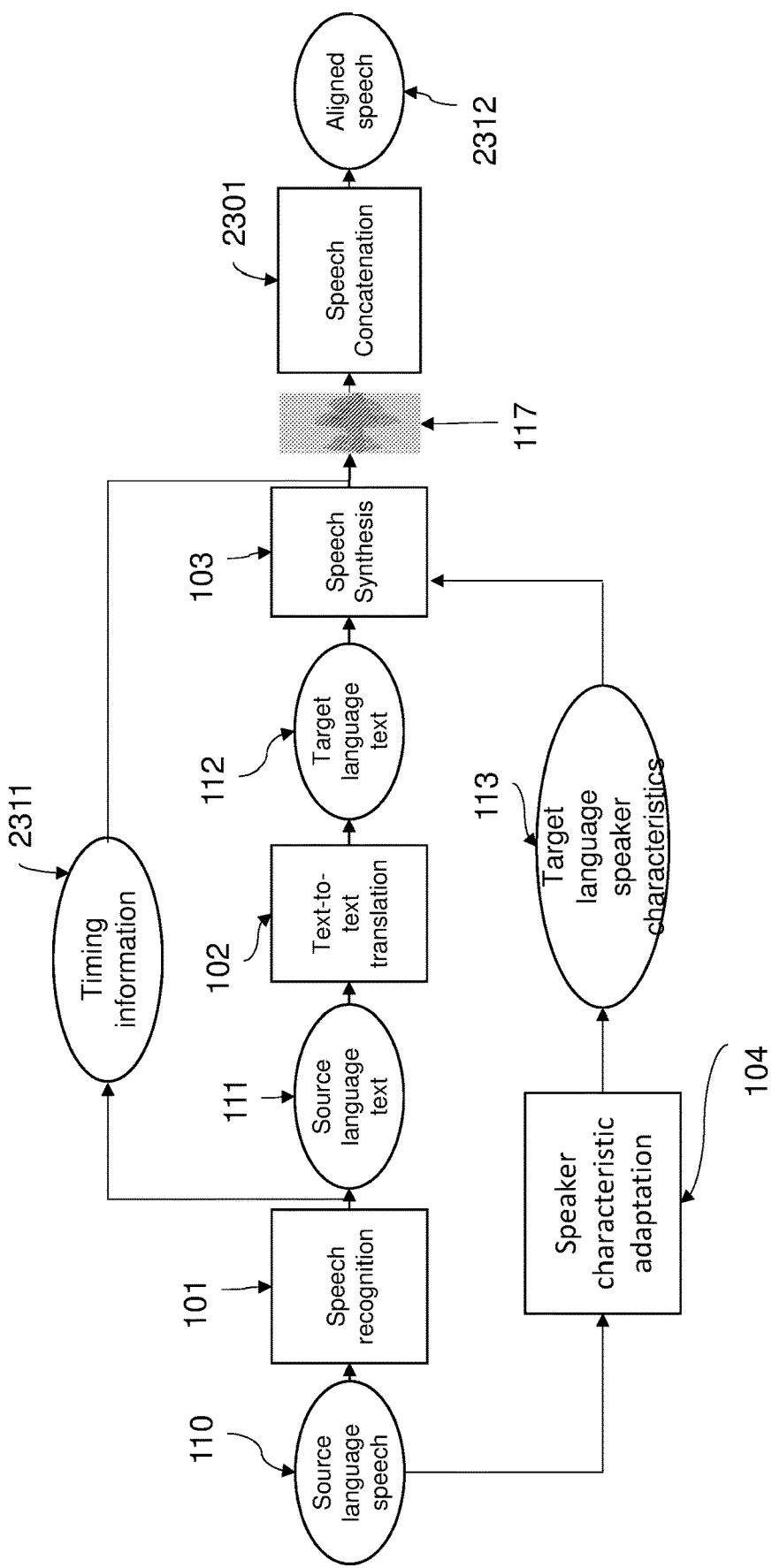
FIG. 23 shows a flow chart illustrating the processing stages included in a speech processing system according to an embodiment.

FIG. 23 shows a flow chart illustrating the processing stages included in a speech processing system according to another embodiment. The system is similar to the system of FIG. 2(a), except for the inclusion of the timing information 2311 and the speech concatenation 2301 which will be described below. Description of the elements already described above will be omitted.

Timing information 2311 is generated by the speech recognition system 101. The speech recognition 101 takes as input segments of source language speech. The speech recognition 101 outputs timing information 2311. The timing information 2311 may comprise the start time and/or end time of each segment of source language speech. For example, the segments are extracted from a longer input audio signal, where the start and end time of each extracted segment from the input audio signal is also extracted.

The timing information 2311 may also comprise timing information for each of the sentences or for each of the words within the segment of the source language text 111. This may be generated by the speech recognition module 101. The timing information may contain the start time and/or end time of each word or sentence in the source language text segment for example. The start time and/or end times indicate which frames of the input audio signal, i.e. the source language speech 110, corresponds to each word, or sentence, in the source language text 111. The timing information 2311 may be a set of time stamps for example.

The speech synthesis stage 103 then generates a plurality of speech segments 117 from the target language text segments 103. A speech concatenation 2301 process then uses the timing information 2311 to align each of the corresponding output speech segments 17 to produce a longer aligned speech signal 2312. For example, the start and/or end times of each input segment can be used to combine the output segments together, so that the timing is the same as the input signal. This may be helpful where the audio signal corresponds to an input video signal for example.

Figure 24:
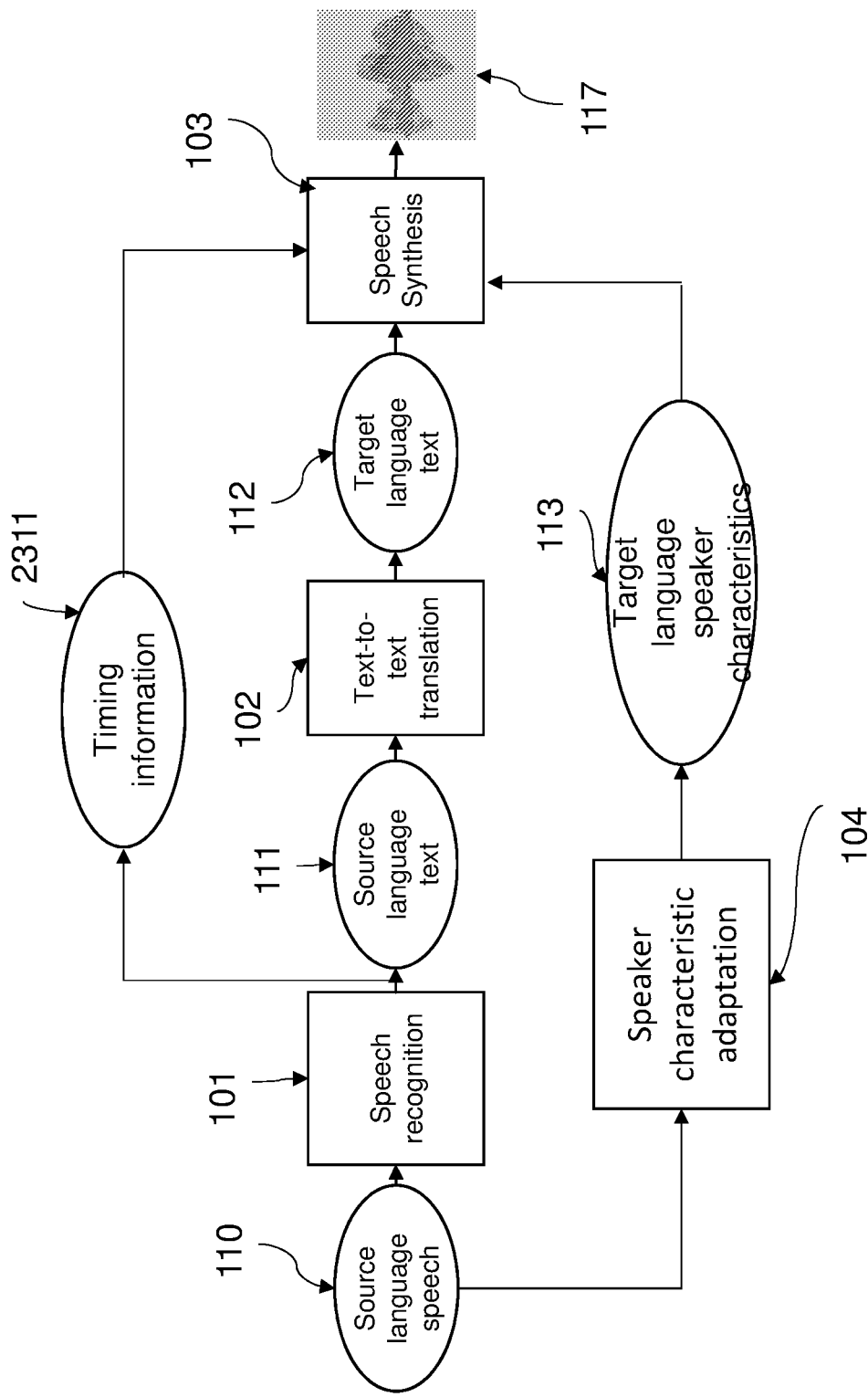
FIG. 24 shows a flow chart illustrating the processing stages included in a speech processing system according to another embodiment.
Figure 25:
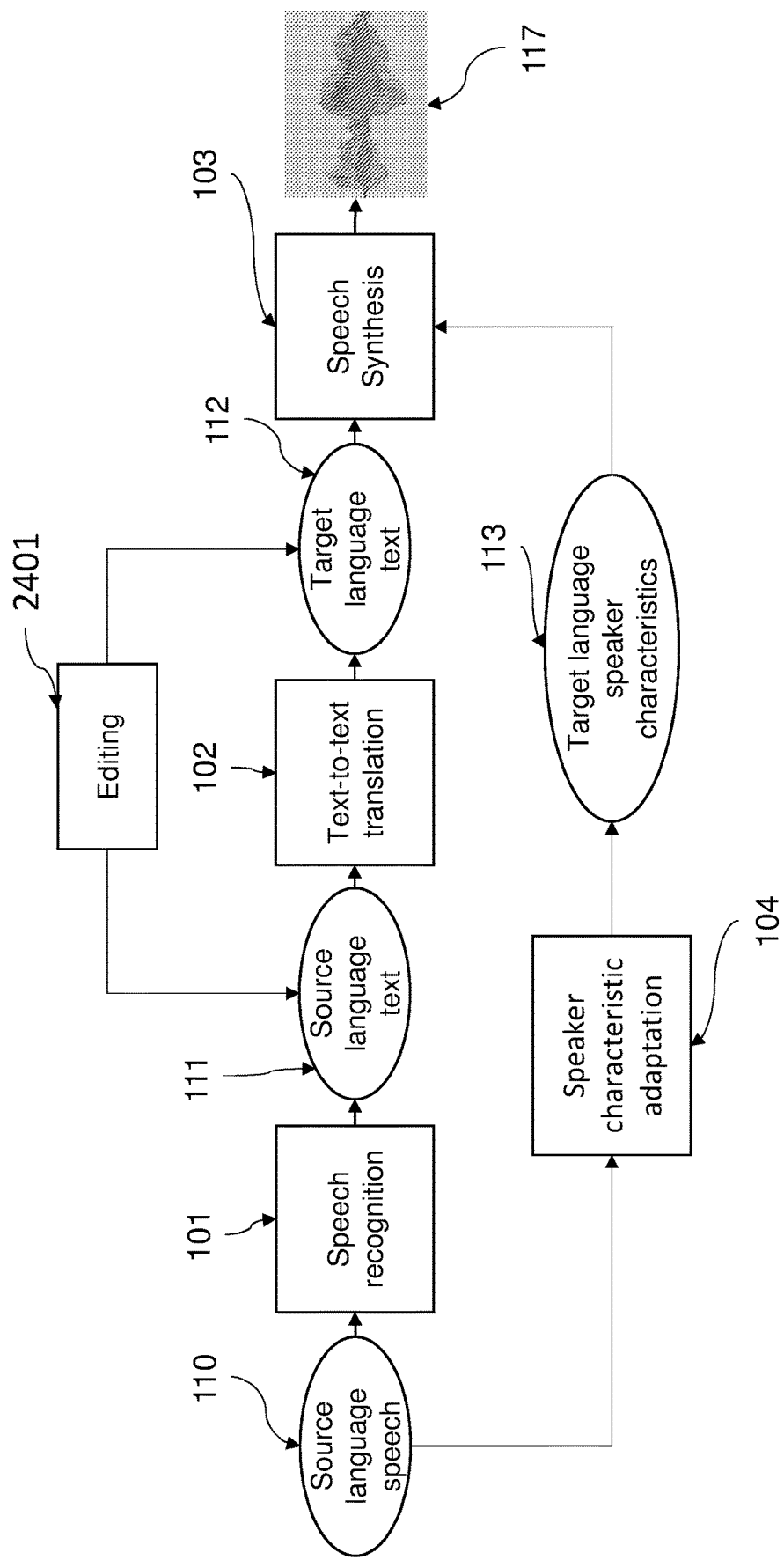
FIG. 25 shows a flow chart illustrating the processing stages included in a speech processing system according to another embodiment.

Any mismatch in timings may be compensated for by modifying the duration of the output speech segments directly (for example as described in FIG. 24 below) or by modifying the text (for example as described in FIG. 25). For example, an output segment 117 may correspond to an input segment having a start time point of 2 hours 13 minutes, and an end time point of 2 hours 13 minutes and 10 seconds. The output segment is combined with the other output segments at a start point of 2 hours 13 minutes. If the duration of the output segment is longer than 10 seconds, modifications may be made as described in relation to the figures below. Timing information relating to words or sentences within the speech segment may also be used to control alignment at the word level, or sentence level for example.

The timing information may also be edited directly by the user, for example where mismatches with a corresponding video signal are noted.

FIG. 24 shows a flow chart illustrating the processing stages included in a speech processing system according to another embodiment. The system is similar to the system of FIG. 2(a), except for the inclusion of the timing information 2311 which will be described below.

As described in relation to FIG. 23 above, timing information 2311 may be generated at the speech recognition stage 101 and used to combine the output speech segments 117. Additionally or alternatively, the timing information may be inputted into the speech synthesis stage 103, and used to modify the duration of the output speech segments 117. In particular, the timing information may be taken as input to the vocoder 301 for example, and used to control re-sampling of the generated speech segments 117.

For example, the timing information 2311 may indicate the duration of the input speech segment 110 (for example it may indicate start and end times of the segment). Where the duration of the output speech segment is determined to be longer than the duration of the input speech segment, a down-sampling process may be performed at the Vocoder 301 to reduce the number of output audio frames. A Fourier method is an example of a method used for re-sampling. A Fourier method involves transforming the data to the frequency domain, deleting components, and transforming back to the time domain to down sample. For example, deleting a number of the highest frequency components can be used to down-sample.

Where the duration of the output speech segment is determined to be shorter than the duration of the input speech segment, an up-sampling process may be performed at the Vocoder 301 to increase the number of output audio frames. The up-sampling process may comprise interpolation of the original frames, or zero-padding for example. A Fourier method involving transforming the data into the Fourier domain, adding high frequency components with zero value, and then transforming back to the time-domain can be used to up-sample.

FIG. 25 shows a flow chart illustrating the processing stages included in a speech processing system according to another embodiment. The system is similar to the system of FIG. 2(a), except for the inclusion of an editing stage 2401 which will be described below. Description of the elements already described above will be omitted.

The editing stage 2401 allows a user to modify the source language text 111 output from the speech recognition stage 101, and/or the target language text 112 output from the text-to-text translation stage 102. A user interface may be provided to allow the user to manually make modifications to the text.

This may allow any errors introduced by the speech recognition module 101 or the text-to-text translation module 102 to be corrected by the user for example. For example, where the user notices that the translated text does not convey the same meaning as the original text, the target language text 112 may be edited by replacement of one or more words, removal of one or more words, or addition or one or more words. The speech synthesis 103 is then performed on the edited text. Similarly, where the user notices that the source language text 111 does not match the input source language speech 110, the source language text 111 may be edited by replacement of one or more words, removal of one or more words, or addition or one or more words. The text-to-text translation 102 is then performed on the edited text.

Modifications may also be made to the source language text 111 and/or the target language text 112 in order to mitigate mismatches in the duration of the input speech segment 110 and output speech segment 117. For example, where the output speech segment 117 and/or the target language text 112 is identified as being longer than the input speech segment 110 and/or source language text 111, the user may edit the source language text 111 and/or the target language text 112 in order to paraphrase.

While certain embodiments have been described, these embodiments have been presented by way of example only, and are not intended to limit the scope of the inventions. Indeed the novel methods and apparatus described herein may be embodied in a variety of other forms; furthermore, various omissions, substitutions and changes in the form of methods and apparatus described herein may be made.

The invention claimed is:

1. A speech processing system for generating translated speech, the system comprising:
    an input for receiving a first speech signal comprising a second language;
    an output for outputting a second speech signal comprising a first language; and a processor configured to:
        generate a first text signal from a segment of the first speech signal, the first text signal comprising the second language;
        generate a second text signal from the first text signal, the second text signal comprising the first language; wherein the second text signal is generated using a text to text translation module taking the first text signal as input, and wherein the text to text translation module outputs alignment information indicating the alignment of words in the first text signal with words in the second text signal;
        convert the second text signal into a sequence of phonetic units and convert the phonetic units into representational vectors;
        combine each of the representational vectors with a characteristic vector to generate a sequence of combined vectors; wherein each characteristic vector corresponds to a word, and wherein the characteristic vector for a word is combined with the one or more representational vectors for the one or more phonetic units corresponding to the word;
        generate a plurality of feature vectors using a trained algorithm and taking the combined vectors as input, the feature vectors comprising audio data, wherein the trained algorithm comprises a trained neural network;
        generate a second speech signal segment from the generated feature vectors, the second speech signal segment comprising the first language.

2. The system according to claim 1, wherein the trained algorithm is a second trained algorithm and wherein the characteristic vectors are generated using a first trained algorithm.

3. The system according to claim 2, wherein the first trained algorithm takes as input the first speech signal.

4. The system according to claim 2, wherein the first trained algorithm comprises a trained neural network.

5. The system according to claim 1, wherein combining each of the representational vectors with a characteristic vector comprises concatenating each representational vector with a corresponding characteristic vector.

6. The system according to claim 1, wherein the characteristic vectors capture emphasis on certain words.

7. The system according to claim 1, wherein a sequence of characteristic vectors corresponding to the second language word order are reordered using alignment information to obtain a sequence of characteristic vectors corresponding to the word order of the first language.

8. The system according to claim 1, wherein generating the second speech signal segment from the generated feature vectors comprises using a vocoder.

9. The system according to claim 1, wherein the feature vectors comprise spectral data.

10. The system according to claim 1, wherein the trained algorithm comprises an attention mechanism.

11. The system according to claim 1, wherein the characteristic vector is generated using a probability distribution.

12. The system according to claim 1, wherein the trained algorithm is a neural network based text-to-speech module.

13. The system according to claim 1, wherein the trained algorithm is a sequence to sequence neural network.

14. The system according to claim 1, wherein the trained algorithm comprises a decoder and wherein the phonetic units are converted into representational vectors using an encoder.

15. The system according to claim 1, wherein the trained algorithm comprises a recurrent neural network.

16. A method of processing a speech signal to generate translated speech, comprising:
   inputting a first speech signal comprising a second language;
   generating a first text signal from a segment of the first speech signal, the first text signal comprising the second language;
   generating a second text signal from the first text signal, the second text signal comprising a first language; wherein the second text signal is generated using a text to text translation module taking the first text signal as input, and wherein the text to text translation module outputs alignment information indicating the alignment of words in the first text signal with words in the second text signal;
   converting the second text signal into a sequence of phonetic units and converting the phonetic units into representational vectors;
   combining each of the representational vectors with a characteristic vector to generate a sequence of combined vectors; wherein each characteristic vector corresponds to a word, and wherein the characteristic vector for a word is combined with the one or more representational vectors for the one or more phonetic units corresponding to the word;
   generating a plurality of feature vectors using a trained algorithm and taking the combined vectors as input, the feature vectors comprising audio data, wherein the trained algorithm comprises a trained neural network;
   generating a second speech signal segment from the generated feature vectors, the second speech signal segment comprising the first language.

17. A non-transitory carrier medium comprising computer readable code configured to cause a computer to perform the method of claim 16.

* * * * *